United States Patent
Grossman et al.

(10) Patent No.: US 9,854,227 B2
(45) Date of Patent: Dec. 26, 2017

(54) DEPTH SENSOR

(71) Applicants: David G Grossman, Vienna, VA (US); Kenneth J Hintz, Fairfax Station, VA (US)

(72) Inventors: David G Grossman, Vienna, VA (US); Kenneth J Hintz, Fairfax Station, VA (US)

( * ) Notice: Subject to any disclaimer, the term of this patent is extended or adjusted under 35 U.S.C. 154(b) by 0 days.

(21) Appl. No.: 15/174,694

(22) Filed: Jun. 6, 2016

(65) Prior Publication Data

US 2016/0295198 A1   Oct. 6, 2016

Related U.S. Application Data

(63) Continuation-in-part of application No. 14/988,355, filed on Jan. 5, 2016.

(60) Provisional application No. 62/100,927, filed on Jan. 8, 2015.

(51) Int. Cl.
H04N 13/02 (2006.01)
G08B 13/196 (2006.01)

(52) U.S. Cl.
CPC ... *H04N 13/0271* (2013.01); *G08B 13/19608* (2013.01); *G08B 13/19695* (2013.01); *H04N 13/0217* (2013.01); *H04N 2213/003* (2013.01)

(58) Field of Classification Search
CPC ........... H04N 13/0271; H04N 13/0217; H04N 2213/003; G08B 13/19608; G08B 13/19695
See application file for complete search history.

(56) References Cited

U.S. PATENT DOCUMENTS

| | | | |
|---|---|---|---|
| 3,004,470 A | 10/1961 | Ruhle | |
| 3,958,118 A | 5/1976 | Schwarz | |
| 4,880,980 A | 11/1989 | Muller et al. | |
| 5,446,285 A * | 8/1995 | Choi | G08B 13/193 250/338.2 |
| 5,712,622 A | 1/1998 | Grossinger et al. | |
| 7,068,416 B2 | 6/2006 | Gim et al. | |
| 7,250,605 B2 | 7/2007 | Zhevelev | |
| 7,399,970 B2 | 7/2008 | Micko | |
| 8,009,044 B2 | 8/2011 | Shafer et al. | |
| 8,180,145 B2 | 5/2012 | Wu et al. | |
| 8,354,643 B2 | 1/2013 | Micko | |
| 2007/0115261 A1 | 5/2007 | Cho et al. | |
| 2008/0079839 A1* | 4/2008 | Sung | G02B 7/38 348/345 |
| 2011/0069189 A1 | 3/2011 | Venkataraman et al. | |
| 2012/0212582 A1* | 8/2012 | Deutsch | G08B 21/245 348/46 |
| 2013/0159350 A1 | 6/2013 | Sankar et al. | |
| 2014/0078302 A1* | 3/2014 | Hamdan | B60Q 1/525 348/148 |
| 2015/0193937 A1 | 7/2015 | Georgiev | |

\* cited by examiner

*Primary Examiner* — Dave Czekaj
*Assistant Examiner* — Berteau Joisil
(74) *Attorney, Agent, or Firm* — David Grossman

(57) ABSTRACT

A depth sensor comprises at least one imaging sensor, at least one multifocal lens, and a focus analyzer. The depth sensor analyzes the in-focus status of electromagnetic radiation, directed by the multifocal lens(es) onto sensing zone(s) of the imaging sensor(s) from spatial zone(s) in a measurement field, to detect the presence of object(s) in the spatial zone(s).

20 Claims, 19 Drawing Sheets

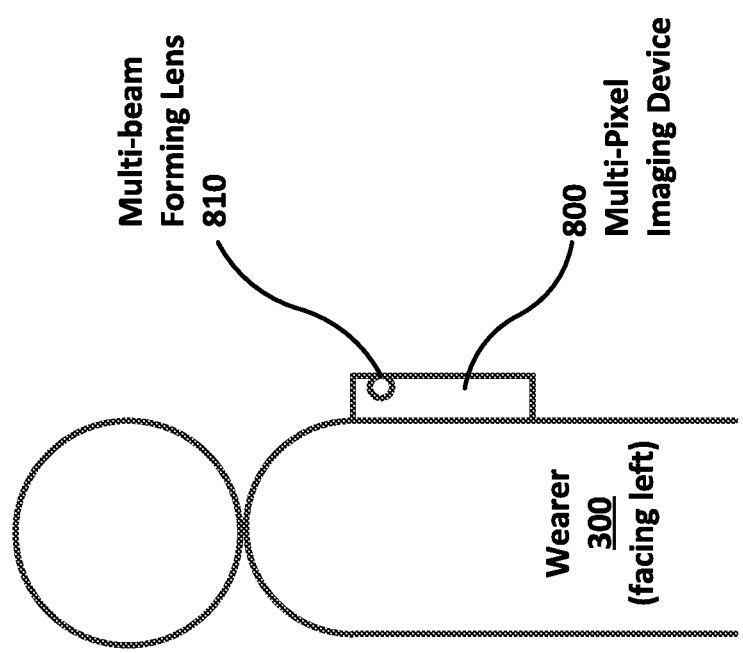

DEPTH SENSOR

CROSS-REFERENCE TO RELATED APPLICATIONS

This application is a continuation-in-part of U.S. patent application Ser. No. 14/988,355, filed Jan. 5, 2016, which claims the benefit of U.S. Provisional Application No. 62/100,927, filed Jan. 8, 2015, which are hereby incorporated by reference in their entirety.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

Example

Example

Example

Example

Example

Example

Example

Example FIG. 8 is a diagram showing a side view of a personal warning device with an imaging sensor mounted upon a user's back according to various aspects of an embodiment.

Example

Example

Example

Example

Example

Example

Example

Example

Example

Example

Example

DETAILED DESCRIPTION OF EMBODIMENTS

Figure 1:
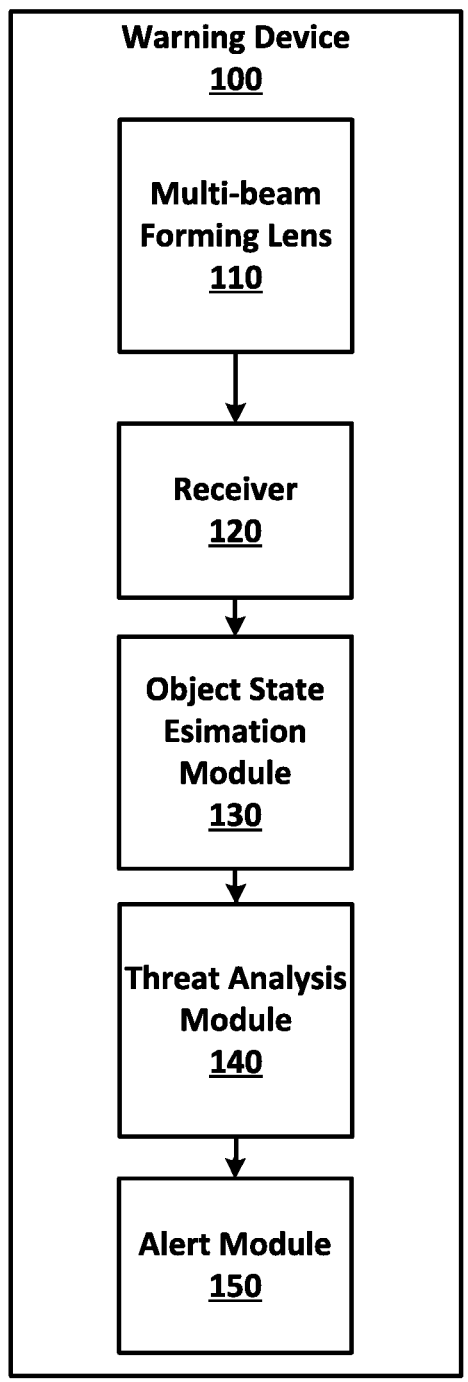
FIG. 1 is a block diagram illustrating a personal warning device according to various aspects of an embodiment.

Embodiments of the present invention comprise a depth sensor comprising imaging sensor(s), multifocal lens(es) and a focus analyzer. The depth sensor may analyze the in-focus status of electromagnetic radiation, directed by the multifocal lens(es) onto sensing zone(s) of the imaging sensor(s) from spatial zone(s) in a measurement field, to detect the presence of object(s) in the spatial zone(s).

Embodiments of the present invention employ a multifocal lens to create a plurality of focused images of different volumetric segments of a measurement field. Each image may be directed to a distinct segment of a sensor(s). Each different volumetric segment image may be evaluated separately and independently of the other volumetric segment images to determine if an object resides in that volumetric segment. This is an improvement to using a plenoptic camera to create depth data. A plenoptic camera inserts a microlens array between the sensor and main lens. However, each microlens creates a different image of the same image field on a distinct segment of a sensor(s). Each image measures the amount of light arriving along a different ray on a segment of the sensor. So, whereas a plenoptic camera may derive depth data through processing and comparison of multiple images of the same image field using various complex algorithms, embodiments of the present invention may derive depth data by independently employing simpler focus analysis mechanisms to evaluate the focus status of each different volumetric segment image separately.

Embodiments of the present invention comprise a personal warning device including a multi-beam forming lens, a receiver, an object state estimation module, a threat analysis module, and an alert module. A personal warning device may be employed to warn a user of an approaching object that they may not otherwise see. According to some of the various embodiments, the warning may be via an emitted alert. Emitted alerts may be comprised of human sensible or device sensible emissions. Embodiments may be configured to detect objects comprising, but not limited to: person(s), car(s), animal(s), potential attacker(s), intruder(s), combinations thereof, and/or the like. The multi-beam forming lens may form multiple beams focused on different spatial zones in the environment in order for each of those beams to allow the personal warning device to detect objects in each of those spatial zones. The receiver may be configured to receive a variety of types of signals, comprising, but not limited to: infrared signals, ultraviolet signals, visual signals, sonar signals, optical imaging signals, electromagnetic signals, combinations thereof, and/or the like. The object state estimation module may be configured to analyze incoming object waveforms reflected from object(s) in a field of view of the personal warning device or radiated by object(s) in the field of view. The threat analysis module may be configured to produce a threat assessment by determining if an object's state vector is within at least one threat detection envelope. The alert module may be configured to issue one or more of a variety of alerts if an object is within a threat region of a multivariable function. Examples of human sensible emitted alerts may comprise, but are not limited to: audible sounds, subsonic vibrations, lights, electric shocks, and activated recordings, combinations thereof, and/or the like. Device sensible emitted alerts may comprise, but are not limited to automatically transmitted messages, coded signals, combinations thereof, and/or the like transmitted by wire or wirelessly to a communications device or a secondary alerting device.

Figure 3:
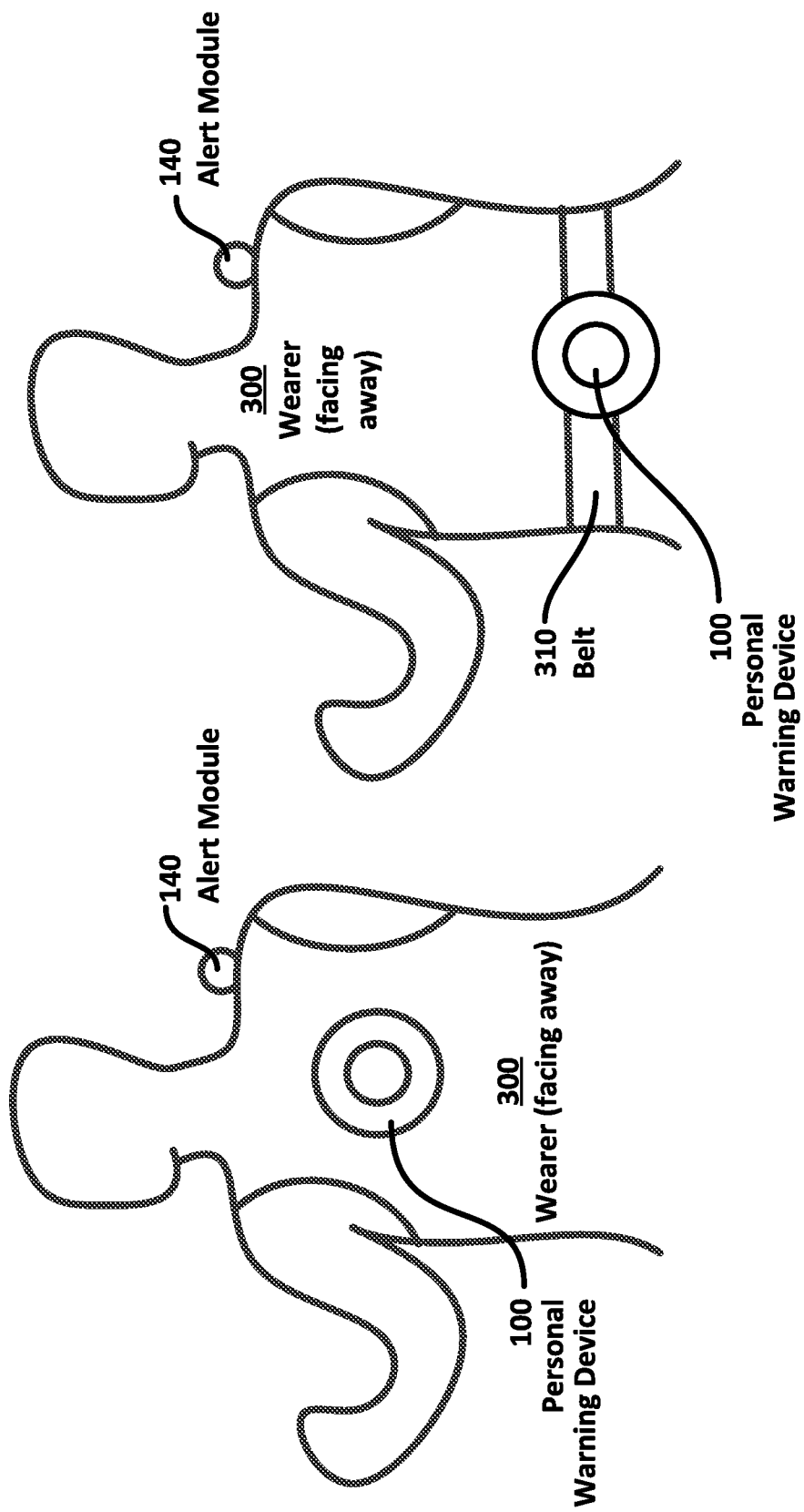
FIG. 3 is a diagram showing a rear view of an embodiment of a personal warning device mounted upon a user's back according to various aspects of an embodiment.
Figure 4:
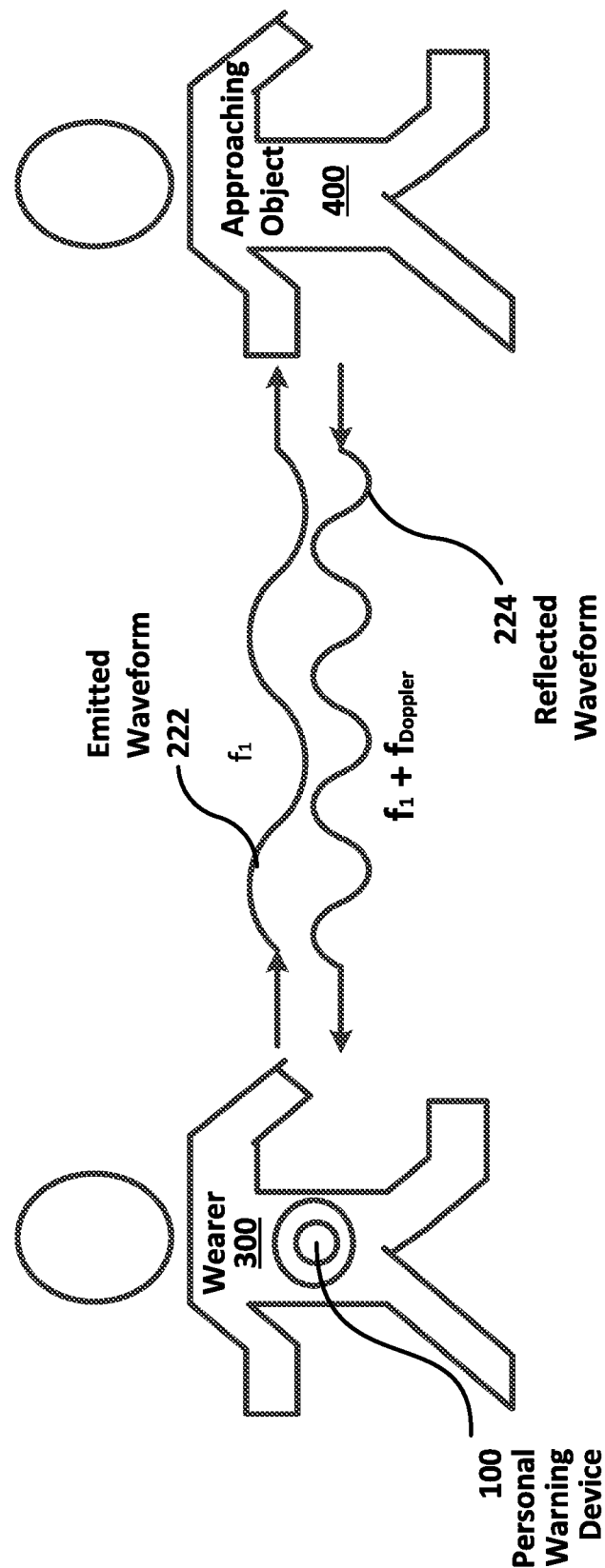
FIG. 4 is a diagram showing a side view of a personal warning device with an acoustic sensor mounted upon a user's back according to various aspects of an embodiment.
Figure 5:
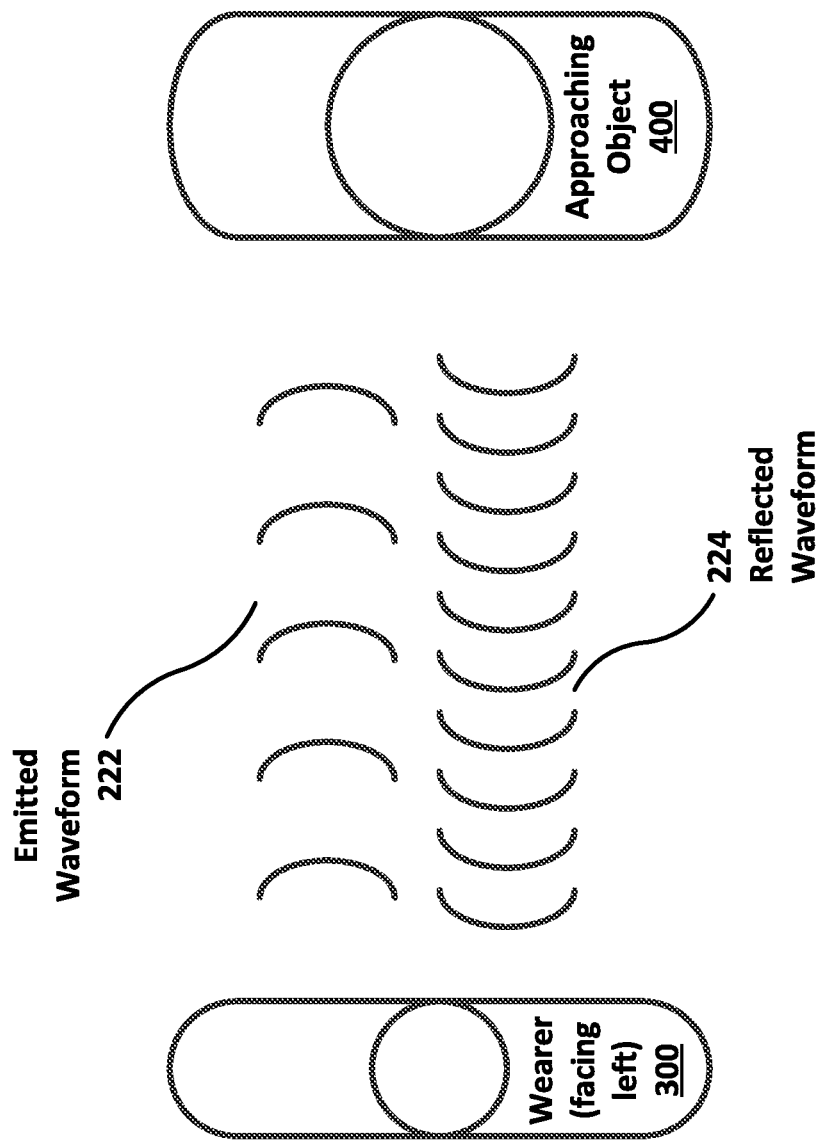
FIG. 5 is a diagram showing a top view of an embodiment of a personal warning device with an acoustic sensor mounted upon a user's back according to various aspects of an embodiment.

Some of the various embodiments may be configured to allow individuals to be alerted to unexpected potential threats approaching them from, for example, outside their field of view. Similarly, some of the various embodiments may be configured to alert a user of intruders in a particular area. A personal warning device may have a mounting means for mounting at least part of the personal warning device on a user's back, arm, harness, belt, or other form of attachment. Some of the various embodiments may comprise a mounting means to mount the personal warning device 100 on a wearable safety vest as illustrated in example FIG. 3. Such a safety vest may further comprise a belt 310 to stabilize the vest and the personal warning device 100. A safety vest according to some of the various embodiments that may be employed as a mounting means for a personal warning device may be acquired, for example, from M L Kishigo, of Santa Ana, Calif. A personal warning device may be mounted on other parts of a user's body as well, such as an arm, leg, or neck band. Additionally, according to some of the various embodiments, a safety vest may comprise an external alert module 140. The external alert module may be configured to emit an alert if an object produces signals within an object detection threshold. Examples of alerts may comprise, but are not limited to: sounds, lights, electric shocks, activated recordings, automatically transmitted messages, combinations thereof, and/or the like.

According to some of the various embodiments, a personal warning device 100 may comprise a multi-beam forming lens 110, a receiver 120, an object state estimation module 130, a threat analysis module 140, and an alert module 150 as illustrated in example FIG. 1.

The multi-beam forming lens 110 may be made out of a variety of materials, including glass, plastic, dielectric materials, combinations thereof, and/or the like. The multi-beam forming lens 110 may form multiple beams focused on different zones. The zones may comprise different ranges, azimuths, elevations, orientations, segments, spatial regions, combinations thereof, and/or the like. Forming multiple beams focused on different zones may be configured to enable the warning device to detect objects at various angles around the user. Forming multiple beams focused on different zones (e.g., as specified by azimuth, elevation, and range) may also enable the warning device to process the movement of objects between zones. Depending on the type of input that the sensor is configured to sense, a multi-beam forming lens may comprise, but not be limited to, one or more of: a refractive lens, a reflective lens, a Fresnel imaging lens, a dielectric lens, an optical lens, a plurality of lenses, a hyperspectral lens, a combination thereof, and/or the like. Lenses may be designed to effectively utilize sonic or ultrasonic frequencies as well as electromagnetic radio frequencies.

As illustrated in example FIG. 9A, FIG. 9B, FIG. 9C, and FIG. 9D, a multi-beam forming lens 920, 930, 940, and 950 may be divided into range-specific lens regions (e.g., 922-929, 932-934, 945, and 955, respectively) and may feature a "true image" region (e.g., 921, 931 and 941 respectively). A "true image" region may comprise an image of one or more zones covering one or more of the range-specific lens regions that is not substantially distorted and/or adjusted. This "true image" region (e.g., 921, 931 and 941 respectively) may be viewed to see a substantially undistorted image of what is occurring in at least part of a sensor's field of view.

According to an embodiment, a "true image region" may comprise one or more of the range-specific lens regions (e.g., 922-929, 932-934, 945, and 955, respectively). In such an example embodiment, one or more of the range-specific lens regions (e.g., 922-929, 932-934, 945, and 955, respectively) may be employed collectively to provide a view of multiple range-specific lens regions (e.g., 922-929, 932-934, 945, and 955, respectively).

This imaging capability may be used to reduce the communications bandwidth associated with a region monitoring system covered by the device. For example, according to some embodiments, the device may operate in a first mode where only detections and/or alerts are communicated. If a monitoring agent then wants to acquire additional information about the detection and/or alert, all or part of the true image region may be communicated to provide additional data. This additional information may be employed to make a judgement about the source of the detection and/or alert.

The segments may be arranged in a variety of patterns, such as a grid, concentric circles, other patterns, a combination thereof, and/or the like. Some examples of patterns are shown in examples 920, 930, 940, and 950 of FIG. 9A, FIG. 9B, FIG. 9C, and FIG. 9D respectively.

The object state estimation module 130 may be configured to analyze the object waveforms received by the receiver to determine at least one object state vector for objects in a field of view of the personal warning device. An object state vector may comprise a variety of data such as, but not limited to the object's: velocity, range, distance, acceleration, relative velocity components, total relative velocity, relative range, relative acceleration components, total relative acceleration, relative distance, a combination thereof, and/or the like. According to an embodiment, a data entry within an object state vector may be determined based, at least in part, upon a comparison between an object's current state and one or more previous states of the object. According to an embodiment, data entry within an object state vector may be determined based, a least in part, upon a previous measurement and a current measurement. An object state vector may be comprised of information derived, at least in part, from one or more temporally separated object waveforms. The selection of data entries within an object state vector may depend upon, for example, the type of sensor employed or the threat detection envelope parameters employed to determine if an object may be a threat. An object state estimation module may analyze when an object crosses a sequence of multiple zones when determining an object's state vector.

It is envisioned that multiple mechanisms may be employed to determine when an object crosses a sequence of multiple zones such as, for example, a finite state machine (FSM) which can be designed to detect a specific sequence of events in the same manner as an FSM can be used to detect words (strings of symbols) in a regular language. A finite state machine is in only one of a finite set of states at a time. The state it is in at any given time is called the present state. The FSM may change from one state to another when initiated by a triggering event or condition; this is called a transition. A particular FSM may be defined, at least in part, by a list of available states and transitions, as well as triggering condition(s) for each transition. Formally, an FSM is a quintuple of sets, M=(S, I, O, δ, β), where S is the finite set of states, I is the finite set of input symbols, O is the finite set of output symbols, δ is the finite set of state transitions, and β is the finite set of output functions.

Figure 11:
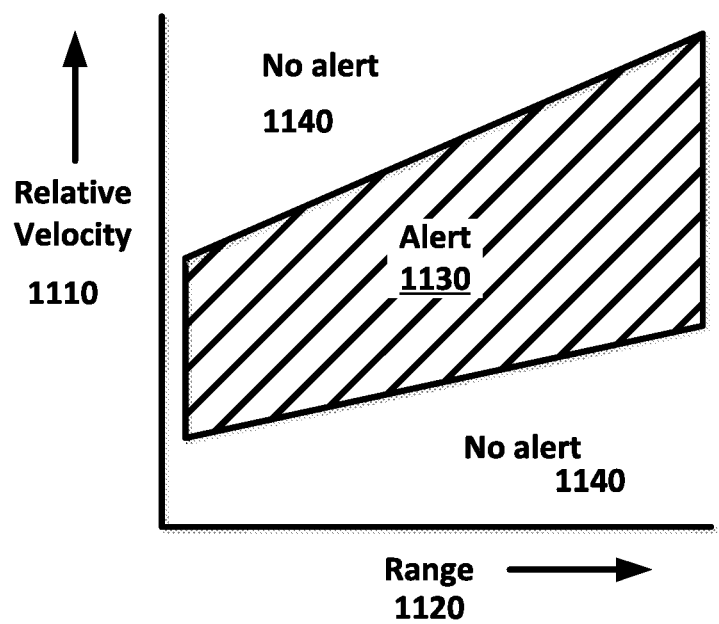
FIG. 11 shows an example embodiment of alert parameters according to various aspects of an embodiment.
Figure 12:
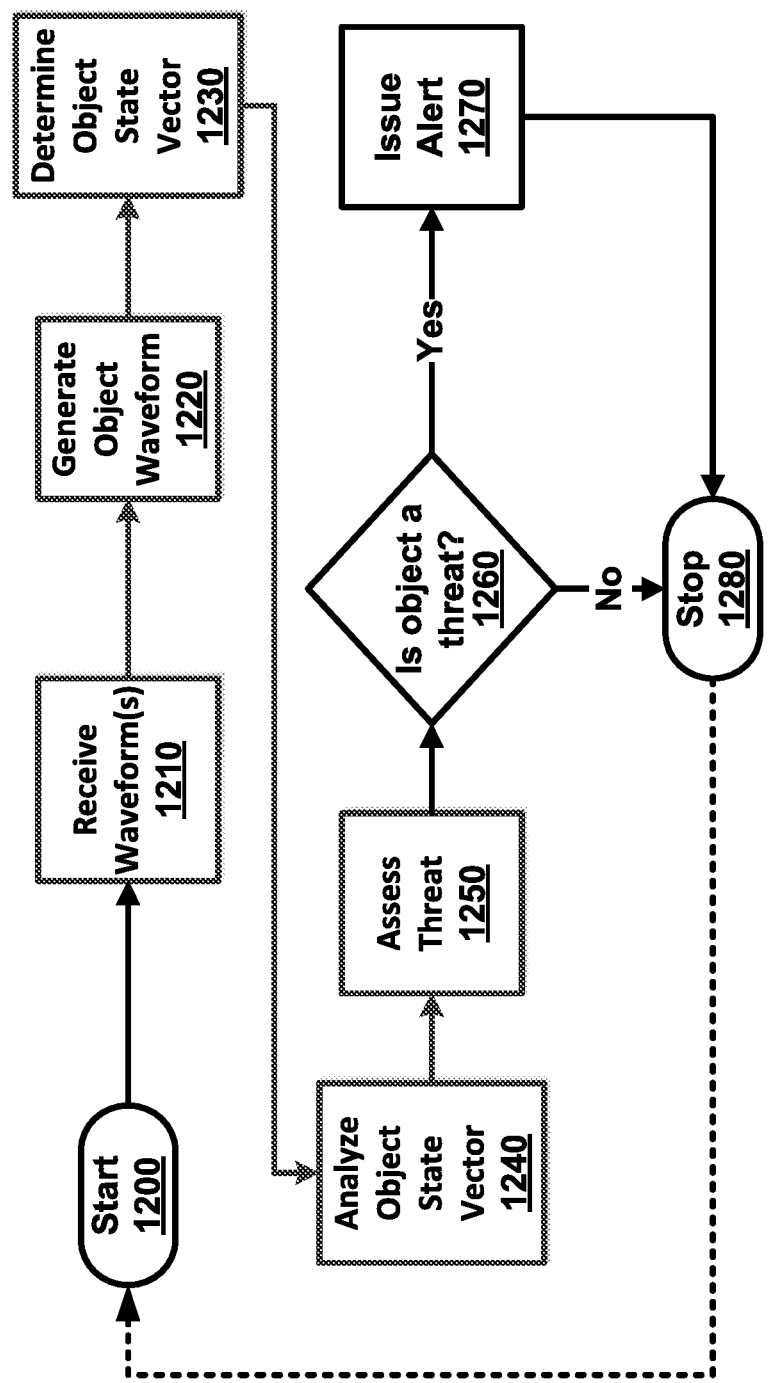
FIG. 12 shows an example process for warning according to various aspects of an embodiment.
Figure 13:
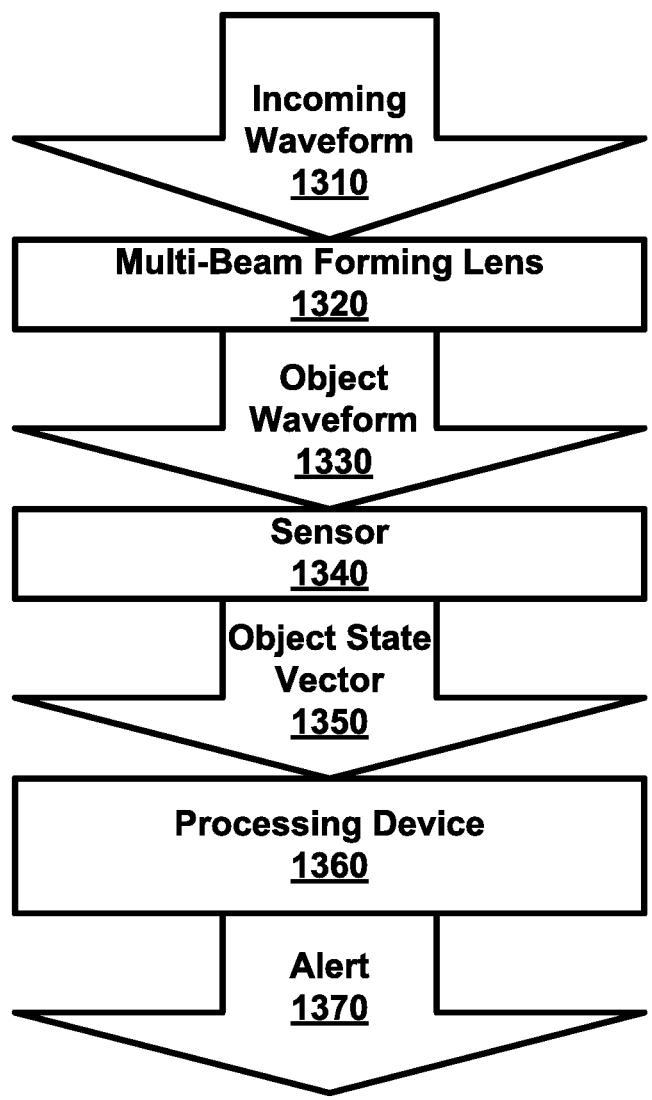
FIG. 13 shows an example method of warning according to various aspects of an embodiment.

The threat analysis module 140 may be configured to produce a threat assessment by determining if at least one object state vector estimated by the object state estimation module 130 falls within at least one threat detection envelope 1130 as shown in FIG. 11. A threat detection envelope may include a minimum range, a maximum range, a minimum acceleration, a minimum velocity, a multi-dimensional feature space, a combination thereof, and/or the like. An example threat detection envelope is shown in FIG. 11. The specific selection of threat detection envelope parameters may depend upon the type of sensor that the receiver employs and upon the specific usage of the personal warning device. A threat assessment may comprise a score or rating indicating how many threat detection envelopes the object state vector falls within or which of several threat detection envelopes that the object state vector falls within. A threat assessment may be weighted such that certain threat detection envelopes may be more influential in determining the threat level than others. The threat analysis module may be configured to allow a user to customize the selection and magnitude of the threat detection envelope parameters essentially setting its operational sensitivity to threats.

Furthermore, a threat assessment module may include a function configured to fuse visual and range data from a conventional visual imaging device such as an Oculus Rift (https://www.oculus.com/en-us/) with the ranging and threat detection data derived from the multi-beam forming lens. The fusing of the binocular vergence ranging data from the visual image with the ranging data derived from the multi-beam forming lens produces a range estimate from the user to the objects in the instantaneous field of view (IFOV) with less error than either component is capable of estimating by itself. This improved estimate of range may also improve the estimate of range rate between the two and provide for an improved estimate of the imminence of an attack.

A visualization module may be incorporated which displays unprocessed visual data, processed threat assessment module data, auxiliary data, or an integrated combination of the data. The visualization module may be configured to produce an augmented reality (AR) view of the user's immediate environment. Furthermore, a visual display coding scheme may be employed to indicate threat parameters such as range, time of arrival of the threat, or other threat relevant data either as a separate panel, or as an enhancement of the normal visual display.

The alert module 150 may be configured to issue an alert if the threat assessment determined by the threat analysis module exceeds a threshold. The threat assessment with respect to individual threat detection envelopes or the total threat assessment of multiple threat detection envelopes, an example of which is shown in FIG. 11 may determine whether the threat assessment exceeds a threshold necessary to issue an alert. The alert module may be configured to issue a variety of alerts, including illuminating a light, activating a recorder, generating a tactile vibration, sending a wireless message, generating an audible sound, a combination thereof, and/or the like. A wireless message or recording may be sent to a predetermined contact, such as, but not limited to an emergency contact or to police. The alert may also activate a variety of other defensive actions, including a light, a wireless message, a sound, a recorder, a pre-recorder, a chemical spray device, an electric shock device, a combination thereof, and/or the like. The alert module may be interfaced with a mobile phone, tablet, or other communication device to customize the nature of the alert or to act as a transmitter for the alert. The alert module may also be triggered by an alternative manual trigger means, such as a panic button or dead-man's switch.

The receiver 140 may comprise one or more of a variety of sensors, including an imaging sensor, a video imaging sensor, an acoustic sensor, an ultrasonic sensor, a thermal imaging sensor, an electromagnetic sensor, an array of sensors, a combination thereof, and/or the like. An imaging sensor may comprise a sensor that detects and conveys data that constitutes an image. An imaging sensor may convert the variable attenuation of waves (as they pass through or reflect off objects) into signals that convey the data about objects in the IFOV. The waves may be light or other ionizing or non-ionizing electromagnetic radiation. Analog or digital image sensors may be used in electronic imaging devices, which may comprise, but are not limited to: digital cameras, camera modules, medical imaging equipment, night vision equipment such as thermal imaging devices or photomultipliers, radar, sonar, and/or the like. An imaging sensor may comprise, for example, a semiconductor charge-coupled device (CCD), an active pixel sensor in complementary metal-oxide-semiconductor (CMOS) or N-type metal-oxide-semiconductor (NMOS, Live MOS) technologies, a combination thereof, and/or the like. A video imaging sensor may comprise one or more imaging sensors configured to transmit one or more image signals as video. Such imaging sensors may be acquired, for example, from ON Semiconductor of Phoenix, Ariz.

An acoustic sensor may comprise a microelectromechanical systems (MEMS) device that, for example, detects the modulation of surface acoustic waves to sense a physical phenomenon. The sensor may transduce an input electrical signal into a mechanical wave which, unlike an electrical signal, may be influenced by physical phenomena. The device may transduce such a mechanical wave back into an electrical signal. Changes in amplitude, phase, frequency, or time-delay between the input and output electrical signals may be employed to measure the presence of phenomena. An acoustic sensor may be acquired, for example, from Interlogix, of Lincolnton, N.C.

Figure 2:
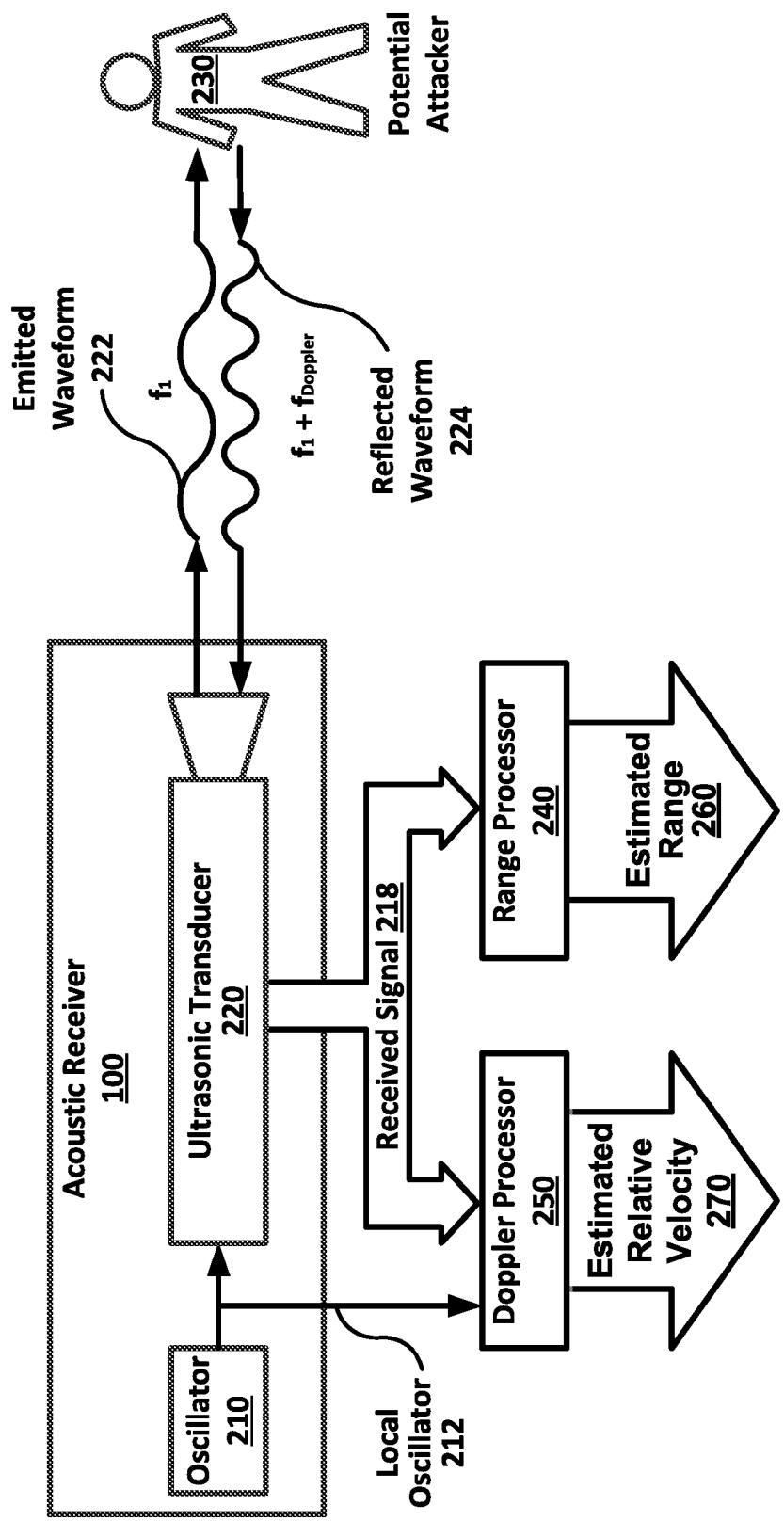
FIG. 2 is a block diagram illustrating an acoustic personal warning device according to various aspects of an embodiment.

For a personal warning device 100 where the receiver is an acoustic sensor, the personal warning device 100 may further include an outgoing waveform transmitter 220, such as an ultrasonic transducer, as shown in the example embodiment of FIG. 2. An ultrasonic sensor may comprise a transducer that converts ultrasound waves to electrical signals and/or vice versa. An ultrasonic sensor that both transmits and receives may be called an ultrasound transceiver. Some ultrasonic sensors besides being sensors may be transceivers because they may both sense and transmit. Ultrasonic detection device(s) and/or system(s) may evaluate, at least in part, attributes of a target by interpreting echoes from radio and/or sound waves. Some of the various active ultrasonic sensors may generate high frequency sound waves, evaluate the sound wave received back by the sensor, and measure the time interval between sending the signal and receiving the echo to determine the distance to an object. Passive ultrasonic sensors may comprise microphones configured to detect ultrasonic waves present under certain conditions, convert the waves to an electrical signal, and report the electrical signal to a device. Various ultrasonic sensor(s) may be acquired, for example, from Maxbotix, of Brainerd, Minn., or from Blatek, Inc. of State College, Pa.

A personal warning device, according to some of the various embodiments, may further comprise a local oscillator 210, and an object waveform analyzed by the object state estimation module may comprise two or more temporally separated incoming waveforms 224. This may involve comparing the frequency of an emitted waveform 222 which may be generated from the local oscillator 210 to that of an incoming waveform 224 reflected off of an object 230 and performing a Doppler shift calculation. This comparison may allow the object state estimation module to estimate the relative velocity of the object with respect to the personal warning device. The incoming waveforms may be modulated waveforms, pulsed waveforms, chirped waveforms, linear swept waveforms, or frequency modulated continuous waveforms or any of a number of other waveforms appropriate to the type of processing desired.

Figure 6:
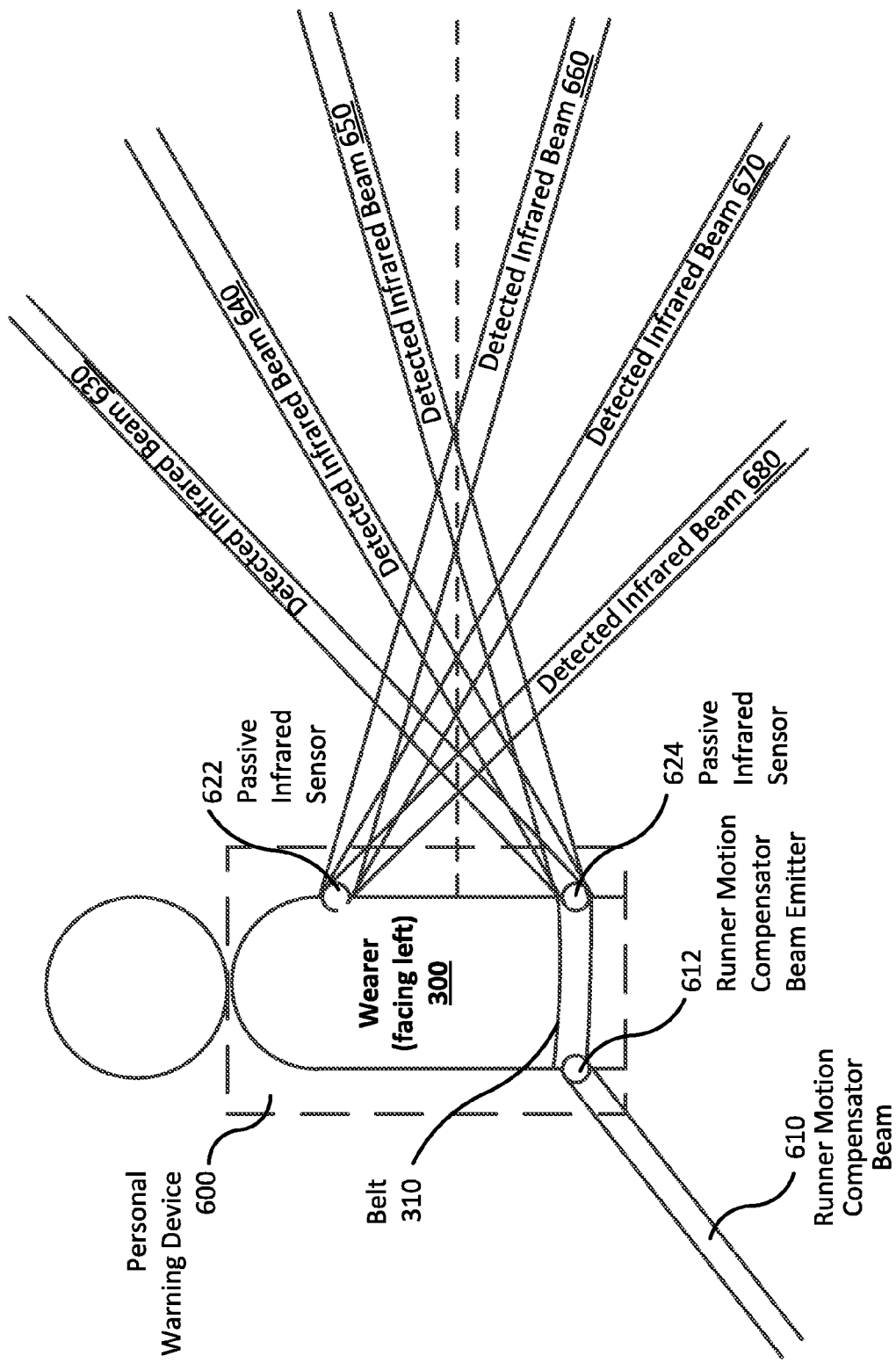
FIG. 6 is a diagram showing a side view of a personal warning device with multiple passive infrared sensors and a runner motion compensator beam mounted upon a runner according to various aspects of an embodiment.
Figure 7:
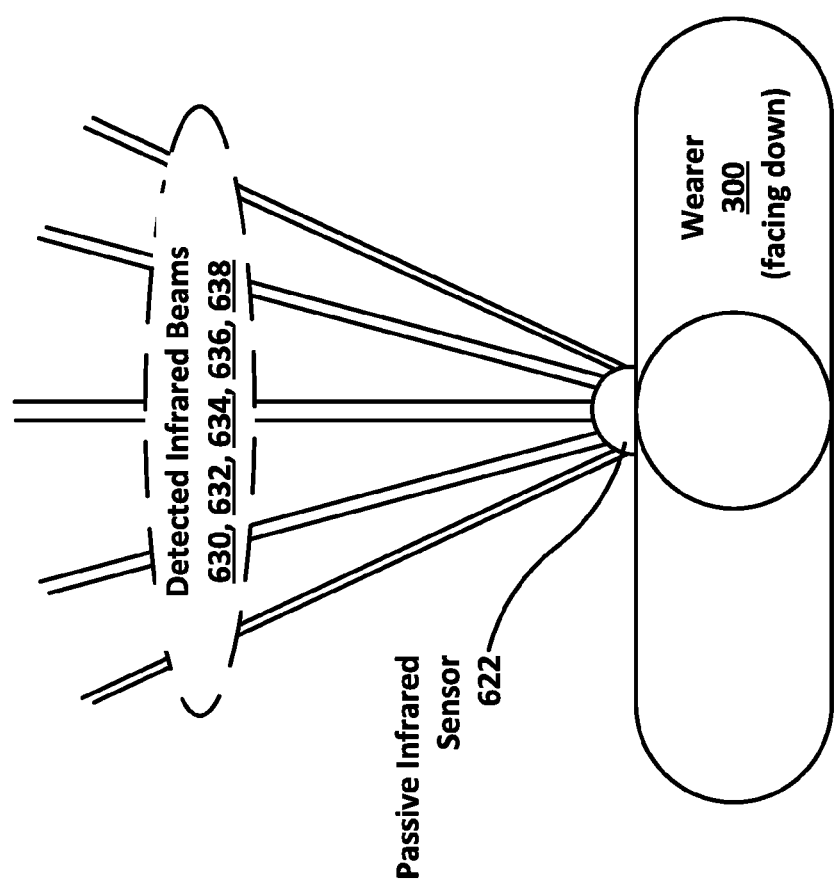
FIG. 7 is a diagram showing a top view of a personal warning device with a passive infrared sensor mounted upon a user's back according to various aspects of an embodiment.

A personal warning device 600, as shown in the example embodiment of FIG. 6, may comprise a receiver comprising two or more passive infrared sensors 622 and 624. A passive infrared sensor (PIR) may measure infrared (IR) light radiating or reflected from objects in a field of view. PIR sensor(s) may be employed in PR-based motion detectors. The term passive in this instance refers to the fact that PIR devices do not generate or radiate any energy for detection purposes. A passive PIR sensor may work by detecting the energy given off by other objects. PIR sensors may not detect or measure "heat," but rather detect infrared radiation emitted or reflected from an object. That is, PIR devices may work through only a portion of the IR band or over the entire IR band from near IR (near the visual band) to far IR (heat). Such a PIR sensor may be acquired, for example, from Adafruit Industries, of New York City, N.Y.

According to some of the various embodiments, a personal warning device with a receiver comprising two or more passive infrared sensors 622 and 624 may further comprise a user motion compensator 610. A user motion compensator may detect a user's motion by infrared, sonar, radar, a combination thereof, and/or the like. For embodiments where the personal warning device 600 is on a moving object such as a person, bicycle, or automobile, the user motion compensator may allow the personal warning device 600 to make motion estimates based on runner motion compensator beam and/or other measurements.

Figure 10:
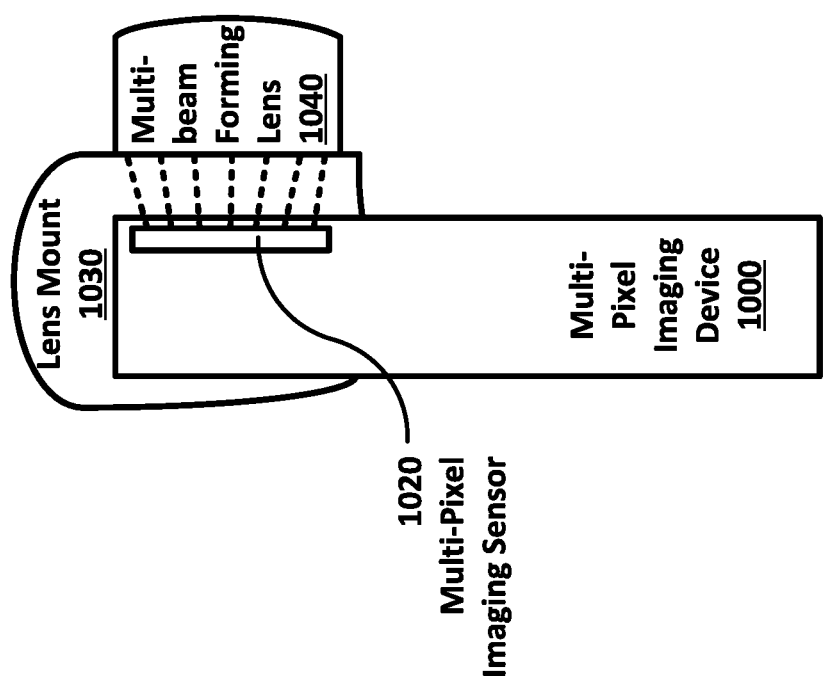
FIG. 10 shows a side view of a personal warning device with an imaging sensor that is mounted upon a user's back according to various aspects of an embodiment.

For a personal warning device where the receiver comprises an imaging sensor, the imaging sensor may be part of the personal warning device itself, or may be a multi-pixel imaging device 800, as shown in the example embodiment of FIG. 8, that is part of, for example, a mobile phone, tablet, digital camera or other device that may be integrated into the rest of the personal warning device. In embodiments shown for example if FIG. 10 where the imaging sensor is provided with a separable multi-pixel image forming device, the multi-beam forming lens 1040 may be a lens on a fixed or removable lens mount 1030 configured to fit outside of the multi-pixel imaging device's own lens 1020 in order to provide the multi-beam forming that may be applied for certain types of detection. The personal warning device may interface with the separate multi-pixel imaging device(s) by a hard-wired connection, such as USB, VGA, component, DVI, HDMI, FireWire, combinations thereof, and/or the like. Similarly, the personal warning device may interface with the separate multi-pixel imaging device wirelessly, such as through Wi-Fi, Bluetooth, combinations thereof, and/or the like.

Figure 14:
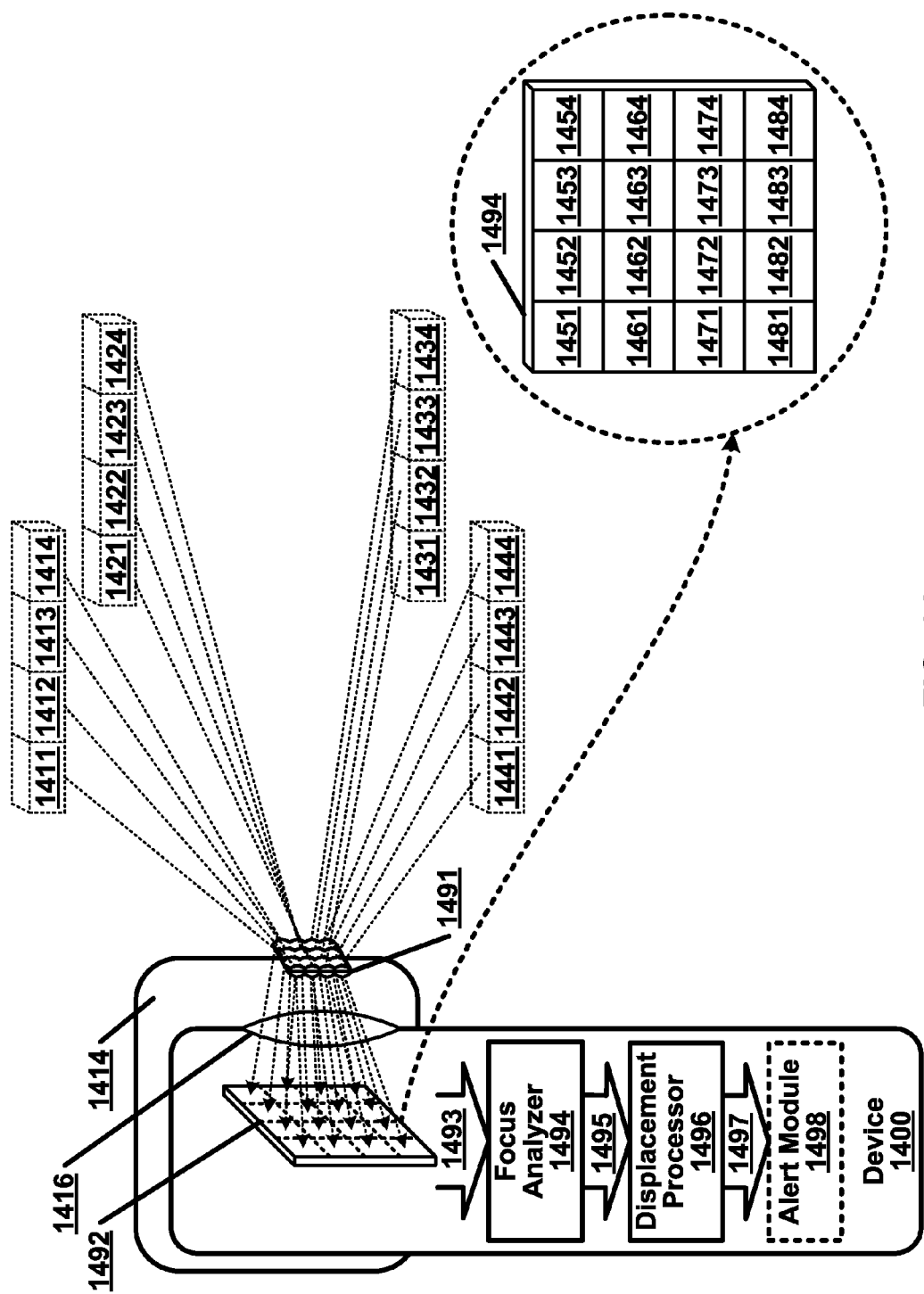
FIG. 14 is an illustration of an example motion detection apparatus according to various aspects of an embodiment.

FIG. 14 is an illustration of an example motion detection apparatus 1410 according to various aspects of an embodiment. The apparatus may comprise: multifocal len(s) 1491, imaging sensor(s) 1492, a focus analyzer 1494, and a displacement processor 1496.

The imaging sensor(s) 1492 may be configured to acquire at least one set of spatiotemporal measurements 1493 of at least two sensing zones (e.g. 1451, 1452, 1453, 1454, 1461, 1462, 1463, 1464, 1471, 1472, 1473, 1474, 1481, 1482, 1483, and 1484). Spatiotemporal measurements 1493 may comprise measurements that indicate optical intensities on imaging sensor(s) 1492 at distinct instances of time which are taken over periods of time. The measurements may also be integrated over shorter intervals at each of the distinct instances of time in order to improve the sensitivity of the sensing action. The electromagnetic intensities may be measured as individual values associated with individual pixels that, when spatially grouped together, provide two dimensional representations of the projection of a three dimensional image.

The imaging sensor(s) 1492 may comprise, for example, at least one of the following: an infrared imaging sensor, an ultraviolet imaging sensor, an optical imaging sensor, a camera, an ionizing or non-ionizing electromagnetic imaging sensor, a light field device, an array of imaging sensors, combinations thereof, and/or the like. Electromagnetic imaging sensor(s) may be sensitive to visual spectrum radiation or various discrete sections of the electromagnetic spectrum such as in a hyperspectral sensor. So, as illustrated in this example embodiment, the imaging sensor(s) 1492 may comprise a camera sensor and motion detection apparatus and the device itself, 1410, may comprise mobile device hardware such as a mobile telephone. Examples of mobile devices comprise smart phones, tablets, laptop computers, smart watches, combinations thereof, and/or the like.

Sensing zones (e.g., 1451 . . . 1484) may comprise a subset of sensing areas (e.g., pixels) on the imaging sensor(s) 1492. At least one of the sensing zones (e.g., 1451 . . . 1484) may comprise a distinct region of the imaging sensor(s) 1492 which does not include the entire sensor. Although example sensing zones (e.g., 1451 . . . 1484) are illustrated as having square shapes, embodiments need not be so limited as the example sensing zones (e.g., 1451 . . . 1484) may be of various shapes such as triangular, hexagonal, rectangular, circular, combinations thereof, and/or the like. Sensing zones also may not be contiguous, but may be interleaved in their projection onto the imaging sensor(s) 1492. Additionally, buffer areas may be located between sensing zones (e.g., 1451 . . . 1484). In yet another example embodiment, the image sensor(s) 1492 may comprise an array of imaging sensors with sensing zones being distributed among the array of imaging sensors.

A multifocal lens may comprise a lens that focuses multiple focal regions to discrete identifiable locations. Multi-focal lenses may comprise an array of lenses, a Fresnel lens, a combination thereof, and/or the like. A multifocal lens has more than one point of focus. A bifocal lens such as is commonly used in eyeglasses, is a type of multifocal lens which has two points of focus, one at a distance and the other at a nearer distance. A multifocal lens can also be made up of an array of lenslets or regions of a single lens with different focal properties such that each region may be referred to as a lenslet. A Fresnel lens is a flat lens made of a number of concentric rings with different optical properties, where each concentric ring may have a different focal point or focus distance.

In this example embodiment, the multifocal len(s) 1491 may be configured to direct light from at least two of a multitude of spatial zones (e.g., 1411, 1412, 1413, 1414, 1421, 1422, 1423, 1424, 1431, 1432, 1433, 1434, 1441, 1442, 1443, and 1444) to sensing zones (e.g., 1451, 1452, 1453, 1454, 1461, 1462, 1463, 1464, 1471, 1472, 1473, 1474, 1481, 1482, 1483, and 1484). These spatial zones are determined not only by their azimuthal and elevation angular extent, but also by their range extent associated with the depth of field of the particular lenslet. So for example, an image of spatial zone 1411 may be directed to sensing zone 1451, an image of spatial zone 1412 may be directed to sensing zone 1452, an image of spatial zone 1413 may be directed to sensing zone 1453, an image of spatial zone 1414 may be directed to sensing zone 1454, an image of spatial zone 1421 may be directed to sensing zone 1461, an image of spatial zone 1422 may be directed to sensing zone 1462, an image of spatial zone 1423 may be directed to sensing zone 1463, an image of spatial zone 1424 may be directed to sensing zone 1464, an image of spatial zone 1431 may be directed to sensing zone 1471, an image of spatial zone 1432 may be directed to sensing zone 1472, an image of spatial zone 1433 may be directed to sensing zone 1473, an image of spatial zone 1434 may be directed to sensing zone 1474, an image of spatial zone 1441 may be directed to sensing zone 1481, an image of spatial zone 1442 may be directed to sensing zone 1482, an image of spatial zone 1443 may be directed to sensing zone 1483, and an image of spatial zone 1444 may be directed to sensing zone 1484. Other mappings of spatial zones to sensing zones are anticipated with various alternative embodiments.

Spatial zone(s) (e.g., 1411 . . . 1444) may comprise a defined region of space as specified by a central point in a Cartesian space (x, y, z) surrounded by an extent in each of those 3 orthogonal directions, e.g., $(+/-\Delta\xi, +/-\Delta\psi, +/-\Delta\zeta)$. An equivalent spatial zone may be defined in spherical coordinates or range, polar angle, and azimuthal angle with the corresponding volume defining the extent of the region as, e.g., $(+/-\Delta\rho, +/-\Delta(, +/-\Delta))$. Spatial zones (e.g., 1411 . . . 1444) may comprise a beam comprising an instantaneous field of view and a constrained depth of field. The terms constrain, constraint, or constrained as used here means to restrict or confine the phenomenon to a particular area or volume of space. Additionally, each of the spatial zones (e.g., 1411 . . . 1444) may be azimuth, elevation and depth of field limited.

The focus analyzer 1494 may be configured to process measurement set(s) 1493 to determine in-focus status 1495 of at least two sensing zones (e.g., 1451 . . . 1484). The term "status" when used in this documents may refer to either the singular or plural in accordance with the usage rules as described in the Oxford Dictionary of the English Language (OED). Focal status 1495 may comprise value(s) representing a probability of projected in-focus object(s) in a sensing zone (e.g., 1451 . . . 1484). Focal status 1495 may comprise value(s) representing a spatial percentage that projected in-focus object(s) occupy in a sensing zone (e.g., 1451 . . . 1484). Focal status 1495 may comprise a value(s) representing characteristics of projected in-focus object(s) in a sensing zone (e.g., 1451 . . . 1484). Values may be represented in analog and/or digital form. In a basic embodiment, value(s) may comprise a binary value(s) representing whether or not an in-focus projection of an object resides in a sensing zone (e.g., 1451 . . . 1484). In a more complex embodiment, value(s) may comprise a collection of values (e.g., an object state vector) that comprise various information regarding projection of object(s) in a spatial zone. Characteristics may comprise, color, texture, location, percentage of focus, shape, combinations thereof, and/or the like.

According to some of the various embodiments, the focus analyzer 1494 may be configured to determine the in-focus status 1495 of measurements 1493 employing one or more of various mechanism. For example, the focus analyzer 1494 may be configured to determine the in-focus status 1495 of measurements 1493 by applying at least one range based point spread function to at least one of the spatiotemporal measurements 1493. A point-spread function is the spatial extent of the image of a point, or equivalently, a mathematical expression giving this for a particular optical or electromagnetic imaging system. Application of the point-spread function may be performed as a deconvolution of the spatiotemporal measurements 1493. Deconvolution is normally done in the frequency (sometimes called Fourier) domain by dividing the Fourier transform of the received signal by the Fourier transform of the point-spread function. This is less difficult to implement than deconvolution in the signal domain. Mathematically the two operations, deconvolution in the signal domain and division in the frequency domain, are equivalent since they form an isomorphism from one space to the other. In another example, the focus analyzer 1494 may be configured to determine at least one focus status by performing a sharpness analysis on at least one of the sensing zones (e.g., 1451 . . . 1484). Sharpness can be defined as distinctness of outline or impression. Since sharpness in an image is a measure of the rate of change of pixel values from one to the next, various techniques can be applied to determine the sharpness of an image. One method is to take the finite difference between adjacent pixels over some region and extract the largest pixel to pixel change. If this largest pixel to pixel change is above a threshold, then one would say the image is "sharp." A second method would be to low pass and high pass the image and compute the high pass to low pass ratio of these values. A sharp image would have a larger value than a non-sharp image. A third method would be to compute the Fourier transform of the image and compare the values of the high frequency and low frequency spectral lines. A sharp image would have significant high frequency power compared to a less-sharp image. In yet another example, the focus analyzer 1494 may be configured to determine at least one focus status 1495 by performing a frequency analysis on at least one of the sensing zones. In yet other example, the focus analyzer 1494 may be configured to determine at least one focus status by performing a deconvolution of spatiotemporal measurements of at least one of the sensing zones.

According to some of the various embodiments, the focus analyzer 1494 may be configured to filter the output of the sensor to a predetermined range when determining the in-focus status. Filtering may comprise mathematical or computational operations in either the signal domain or signal frequency domain. Here we use the word signal to represent either the time or spatial domains and the phrase signal frequency to mean either temporal frequency or spatial frequency. Spatiotemporal signals may be analyzed both in the temporal and spatial frequency domains.

According to some of the various embodiments, the focus analyzer 1494 may be configured to analyze changes in measurement set 1493 comprising, but not limited to: analyzing changes in measurement values, analyzing measurement(s) 1493 for detectable edges, analyzing measurement(s) 1493 for differential values, combinations thereof, and/or the like.

The displacement processor 1496 may be configured to generate object displacement vector(s) 1497, based at least in part, on a sequence of focus status 1495 indicative of object(s) moving between at least two of the multitude of spatial zones (e.g., 1411 . . . 1444). Various mechanisms may be employed to generate object displacement vector(s) 1497. For example, displacement processor 1496 may be configured to generate the object displacement vector(s) 1497 employing sequential analysis. Sequential analysis may comprise analyzing the focus status 1495 for a multitude of sensing zones (e.g., 1411 . . . 1444) sequentially in time or space to determine if an object has passed through a multitude of spatial zone(s) (e.g., 1411 . . . 1444). The displacement processor 1496 may set object displacement vector(s) to a value (e.g., a null value) when fewer than two of the in-focus statuses each exceed at least one predetermined criterion. This null value may then indicate that a displacement vector 1497 does not exists and/or was not calculated within, for example, reliable parameters and/or reproducible values. Additionally, according to some of the various embodiments, the displacement processor 1496 may be configured to convert at least two in-focus status into at least one binary valued sequence. Such a sequence may be processed to generate object displacement vector(s), for example, employing, at least in part, a finite state machine, look-up table, or computational process to determine the movement of an object between spatial zone(s) (e.g., 1411 . . . 1444). For example, the displacement processor 1496 may be configured to generate object displacement vector(s) 1497 by comparing at least one binary valued sequence against at least one predetermined binary valued sequence. A predetermined binary sequence may be a predetermined list of binary values, or alternatively, a predetermined computational process configured to dynamically generate a binary valued sequence. According to some embodiments, the binary valued sequence may represent values other than zero and 1.

The displacement processor 1496 may be configured to generate object displacement vector(s) 1497 by analyzing, at least in part, at least two in-focus status 1495 with respect to displacement criteria. The displacement criteria may employ, at least in part, mathematical equation(s), analytic function(s), rule(s), physical principals, combinations thereof, and/or the like. For example, a displacement vector may be generated by analyzing the time and/or spatial movement of object(s) moving between spatial zones (e.g., 1411 . . . 1444) to determine displacement criteria and/or characteristics such as direction, acceleration, velocity, a collision time, an arrival location, a time of arrival, combinations thereof, and/or the like.

The multi-focal lens(es) may be configured to map light from each of a multitude of the spatial zone(s) (e.g., 1411 . . . 1444) onto at least two of the sensing zones (e.g., 1451 . . . 1484) respectively through a camera lens (e.g., 1416). The camera lens 1416 may be a mobile device camera lens 1416 as illustrated in the example embodiment of FIG. 14. As illustrated in this example embodiment, multifocal lens 1491 may be disposed external to device 1410. An example mechanism for disposing multifocal lens 1491 external to device 1410 may comprise a clip, a bracket, a strap, an adhesive, a device case, combinations thereof, and/or the like.

Device 1410 may further comprise an alert module 1498 configured to activate an alert (or other type of notification) in response to one or more displacement vectors 1497 exceeding predetermined threshold(s). According to some of the various embodiments, at least one alert may be reported to at least one of the following: a user of the device 1410, a facility worker (when the device is used to detect motion in a facility), a tracking device, an emergency responder, a remote (non co-located) monitoring service or location, a combination of the above, and/or the like. A determination as to where an alert may be routed may be based on an alert classification. For example, a facility alert may be routed to a facility worker and/or an alarm monitoring station. A personal alarm that indicates a probability of harm to a person (e.g., a blind spot attack) may be reported to a first responder such as the police and/or the person being attacked.

Methods of notification may include, but are not limited to: email, cell phone, instant messaging, audible (sound) notification, visual notification (e.g. blinking light), combination thereof, and/or the like. Some embodiments may start with the least disturbing methods first (e.g., sounds and lights) and amplify with time until attended to. Yet other embodiments may start with an alert configured to scare away an attacker. Methods of notification may include coded alerts indicating relative or absolute location of the object of interest.

According to some of the various embodiments, the device 1410 may comprise an optical source to radiate a fluorescent inducing electromagnetic radiation configured to cause skin fluorescence. Such a source may comprise a fluorescent UV light that outputs a light comprising approximately 295 nm wavelength light. Sensor 1492 may be sensitive to the spectrum of fluorescing radiation and employ the detection of such fluorescent radiation in spatial zones (e.g., 1451 . . . 1484) to discriminate between non-human objects and humans.

Figure 15:
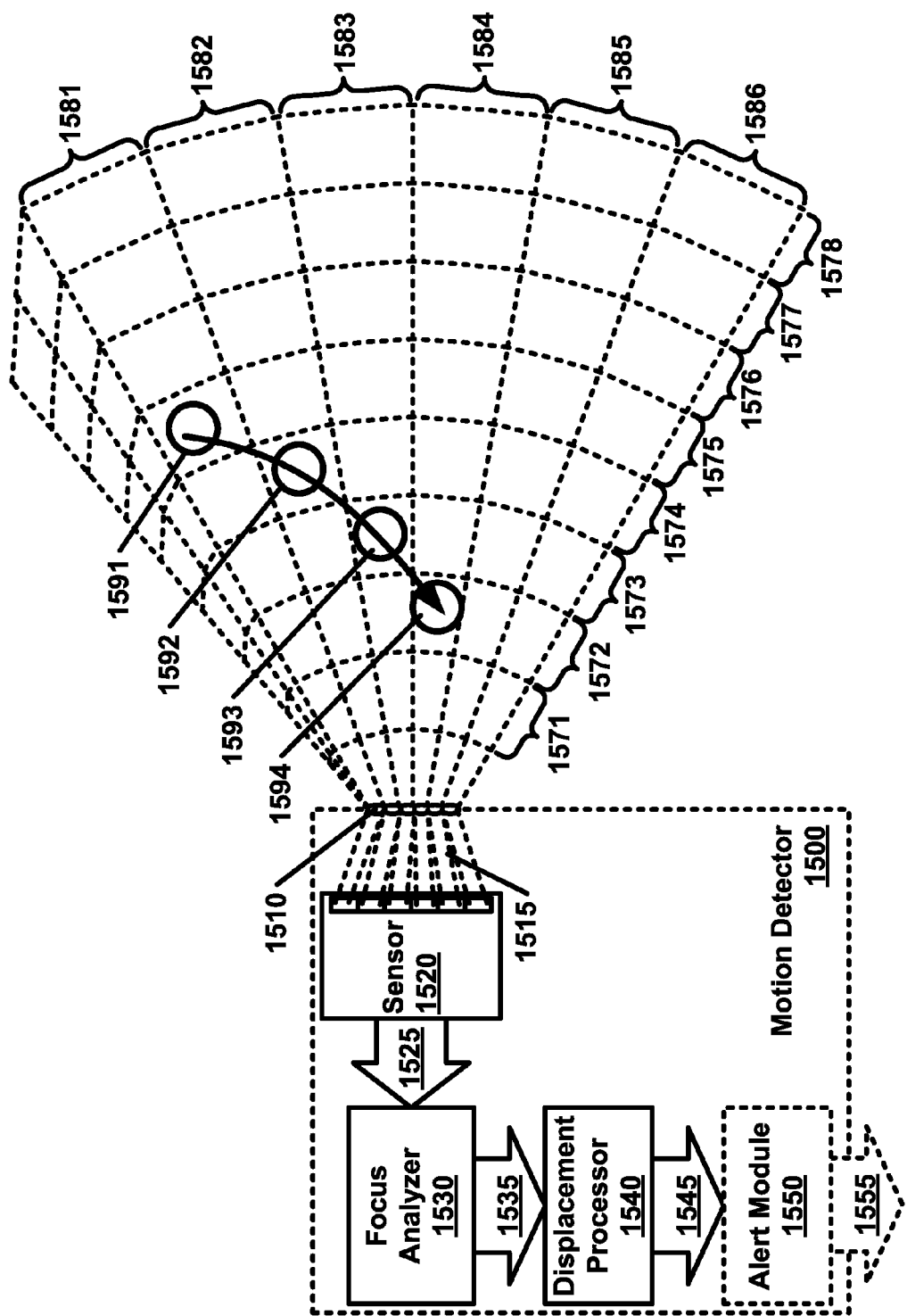
FIG. 15 is a diagram illustrating a motion detector detecting an object at various times as it passes through a series of spatial zones according to an embodiment.

FIG. 15 is a diagram illustrating a motion detector 1500 detecting an object at various times (e.g., 1591, 1592, 1593 and 1594) as it passes through a series of spatial zones (e.g., volumetric zones represented by the intersecting sections of beams 1581, 1582, 1583, 1584, 1585 and 1586 with depth of field ranges 1571, 1572, 1573, 1574, 1575, 1576, 1577, and 1578) according to an embodiment. As illustrated in this example embodiment as shown in FIG. 15, motion detector 1500 comprises lens(es) 1510, sensor(s) 1520, focus analyzer 1530, and displacement processor 1540.

Sensor(s) 1520 may be configured to acquire at least one set of spatiotemporal measurements 1525 of at least two distinct focus zones (e.g., volumetric zones represented by the intersecting sections of beams 1581 . . . 1586 with depth of field ranges 1571 . . . 1578). Sensor(s) 1520 may comprise at least one of the following: an active acoustic sensor, a passive acoustic sensor, a sonar sensor, an ultrasonic sensor, an infrared sensor, an imaging sensor, a camera, a passive electromagnetic sensor, an active electromagnetic sensor, a radar, a light field device, an array of sensors, a combination thereof, and/or the like.

At least one of the spatiotemporal measurement sets 1525 may be acquired employing a lens(es) 1510 at a fixed focus. Spatiotemporal measurements 1525 may comprise predetermined sequence(s).

The distinct focus zones (e.g., volumetric zones defined by the intersections of 1571, 1572, 1573, 1574, 1575, 1576, 1577, 1578 and 1581, 1582, 1583, 1584, 1585, 1586) may be azimuth, elevation and depth of field limited. For example, distinct spatial zones (e.g., volumetric zones defined by the intersections of 1571 . . . 1578 and 1581 . . . 1586) may comprise beam(s) comprising an instantaneous field of view and a constrained depth of field.

The focus analyzer 1530 may be configured to process each of the measurement set(s) 1525 to determine an in-focus status 1535 of at least two distinct focus zones (e.g., volumetric zones defined by the intersections of 1571 . . . 1578 and 1581 . . . 1586). The focus analyzer 1530 may be configured to determine the in-focus status 1535 by applying one or more focus determination mechanisms. For example, focus analyzer 1530 may be configured to determine the in-focus status 1535 by applying at least one point-spread function to at least one of the spatiotemporal measurement set(s). In yet another example, focus analyzer 1530 may be configured to determine at least one focus status 1535 by performing a sharpness analysis on at least one of the distinct focus zones. In yet another example, focus analyzer 1530 may be configured to determine at least one focus status 1535 by performing a frequency analysis on at least one of the distinct focus zones. In yet another example, focus analyzer 1530 is further configured to determine at least one focus status 1535 by performing a deconvolution of spatiotemporal measurements of at least one of the distinct focus zones.

The focus analyzer 1530 may be configured to filter the output of the sensor to a predetermined range when determining the in-focus status 1535.

The displacement processor 1540 may be configured to generate at least one object displacement vector 1545, based at least in part, on a sequence of in-focus status 1535 indicative of an object moving between at least two of the at least two distinct focus zones (e.g., volumetric zones defined by the intersections of (1571 . . . 1578 and 1581 . . . 1586). The displacement processor 1540 may be configured to generate the object displacement vector 1545 employing one or more displacement analysis mechanisms. For example, displacement processor 1540 may be configured to generate the object displacement vector 1545 employing sequential analysis. Displacement processor 1540 may be configured to set the object displacement vector 1545 to a null value when fewer than two of the in-focus statuses 1535 each exceed at least one predetermined criterion. Displacement processor 1540 may be configured to convert at least two in-focus status 1535 into at least one binary valued sequence. The displacement processor 1540 may be configured to generate the object displacement vector 1545 by comparing at least one binary valued sequence against at least one predetermined binary valued sequence. Displacement processor 1540 may be configured to generate the object displacement vector 1545, based at least in part, utilizing a finite state machine. Displacement processor 1540 may be configured to generate the object displacement vector 1545 by analyzing, at least in part, at least two in-focus status 1535 with respect to displacement criteria. Displacement criteria may comprise value(s) and/or ranges(s) of values. Values(s) and/or ranges of value(s) may comprise dynamically determined value(s) and/or predetermined static value(s). Examples of dynamically determined values comprise values determined employing equation(s), analytic function(s), rule(s), combinations thereof, and/or the like.

Lens(es) 1510 may be configured to map light from each of at least two of the distinct focus zones (e.g., the intersections of 1581 . . . 1586 and 1571 . . . 1578) onto a distinct region of the sensor 1520 respectively. Lens(es) 1510 may comprise a multi-focal lens configured to map light from each of at least two of the distinct focus zones (e.g., the intersections of 1581 . . . 1586 and 1571 . . . 1578) onto a distinct region of the sensor 1520 respectively. According to some of the various embodiments, the multi-focal lens may be configured to map light from each of at least two of the distinct focus zones (e.g., the intersections of 1581 . . . 1586 and 1571 . . . 1578) onto a distinct region of the sensor 1520 respectively through a camera lens. Additionally, multi-focal lens may be configured to map light from each of at least two of the distinct focus zones (e.g., the intersections of 1581 . . . 1586 and 1571 . . . 1578) onto a distinct region of the sensor 1520 on a mobile device.

The motion detector 1500 may further comprise an alert module 1550. The alert module 1550 may be configured to activate an alert 1555 in response to the displacement vector 1545 exceeding a predetermined threshold.

In yet another embodiment, a motion sensor may comprise an acoustic motion sensor. The acoustic motion sensor may comprise at least one audible or non-audible acoustic sensor, a status analyzer, and a displacement processor. The acoustic sensor(s) may be configured to acquire at least one set of spatiotemporal measurements of at least two distinct zones. The status analyzer may be configured to process each of the set(s) to determine an object presence status of at least two distinct zones. The displacement processor may be configured to generate object displacement vector(s), based at least in part, on a sequence of object presence status indicative of an object moving between at least two of the distinct zones.

Figure 16:
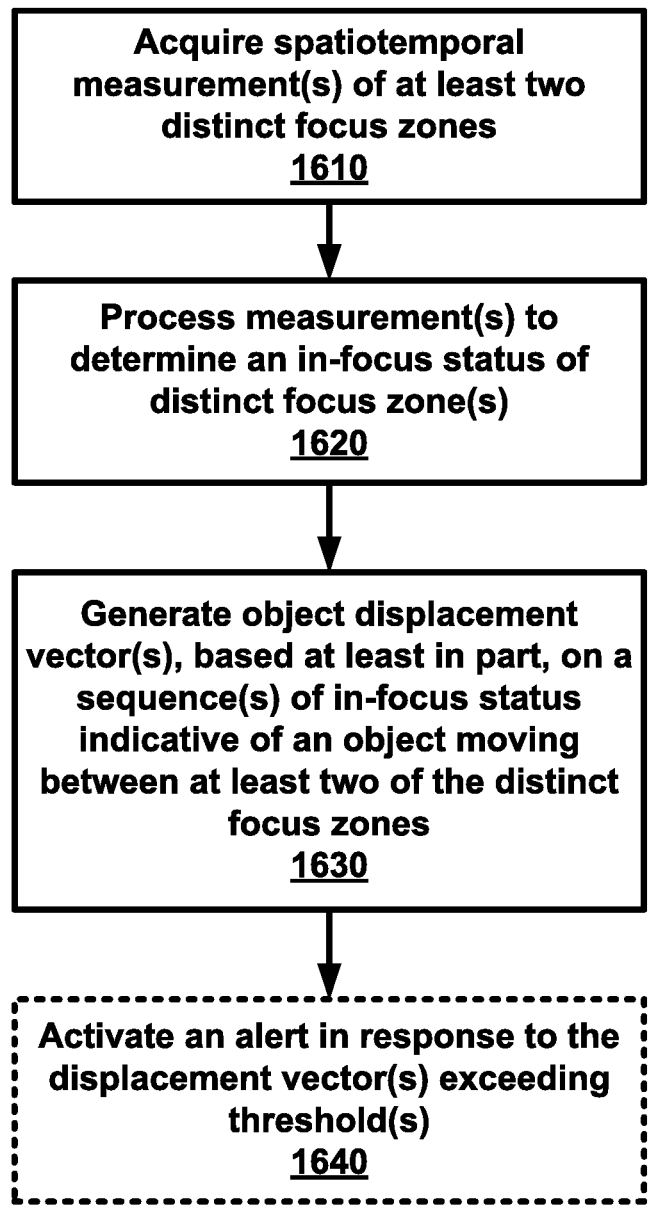
FIG. 16 is a flow diagram of motion detection according to various aspects of an embodiment.

Example FIG. 16 is a flow diagram of motion detection according to various aspects of an embodiment. At least one set of spatiotemporal measurements of at least two distinct focus zones may be acquired from a sensor at 1610. The sensor may comprise at least one of the following: a passive acoustic sensor, an active acoustic sensor, a sonar sensor, an ultrasonic sensor, an infrared sensor, an imaging sensor, a camera, a passive electromagnetic sensor, an active electromagnetic sensor, a radar, a light field device, an array of homogeneous sensors, an array of heterogeneous sensors, a combination thereof, and/or the like. At least one of the at least one set of spatiotemporal measurements may be acquired employing a transducer at a fixed focus.

The spatiotemporal measurements may comprise a predetermined sequence. Each of the distinct focus zones may be azimuth, elevation and depth-of-field limited. According to some of the various embodiments, the distinct spatial zones may comprise a beam comprising an instantaneous field of view and a constrained depth of field.

The set(s) may be processed to determine an in-focus status of at least two distinct focus zones at 1620.

According to various embodiments, the in-focus status may be determined employing one or more focus determination mechanisms. For example, the in-focus status may be determined by applying at least one point-spread function to at least one of the at least one set of spatiotemporal measurements. The focus status may be determined by performing a sharpness analysis on at least one of the distinct focus zones. The at least one focus status may be determined by performing a frequency analysis on at least one of the distinct focus zones. The at least one focus status may be determined by performing a deconvolution of spatiotemporal measurements of at least one of the distinct focus zones.

The output of the sensor may be filtered to a predetermined range when determining the in-focus status.

At least one object displacement vector may be generated at 1630, based at least in part, on a sequence of in-focus status indicative of an object moving between at least two of the distinct focus zones. The object displacement vector may be determined employing at least one object vector determination mechanisms. For example, the object displacement vector may be determined employing at least one sequential analysis process. The at least one object displacement vector may produce a null value or null signal or null symbol when fewer than two of the in-focus status each exceed at least one predetermined criterion. The at least two in-focus status may be converted into at least one binary valued sequence. The object displacement vector may be generated by comparing at least one binary valued sequence against at least one predetermined binary valued sequence. The object displacement vector may be generated, based at least in part, utilizing a finite state machine. The object displacement vector may be generated by analyzing, at least in part, at least two in-focus status with respect to displacement criteria. (e.g., according to math equation, an analytic function, set of rules, combinations thereof, and/or the like.)

The method further comprises activating an alert in response to the displacement vector exceeding a threshold at 1640. The method may further comprise: radiating a fluorescent inducing electromagnetic radiation and discriminating between objects and humans based on the detection of a fluorescent radiation from a human.

The method may further comprise mapping light from each of at least two of the distinct focus zones onto a distinct region of the sensor respectively. The method may further comprise mapping electromagnetic radiation employing a multi-focal lens from each of at least two of the distinct focus zones onto a distinct region of the sensor respectively. The method may further comprise mapping light employing a multi-focal lens from each of at least two of the distinct focus zones onto a distinct region of the sensor respectively through a camera lens. The method may further comprise mapping light employing a multi-focal lens from each of at least two of the distinct focus zones onto a distinct region of the sensor on a mobile device.

Figure 17:
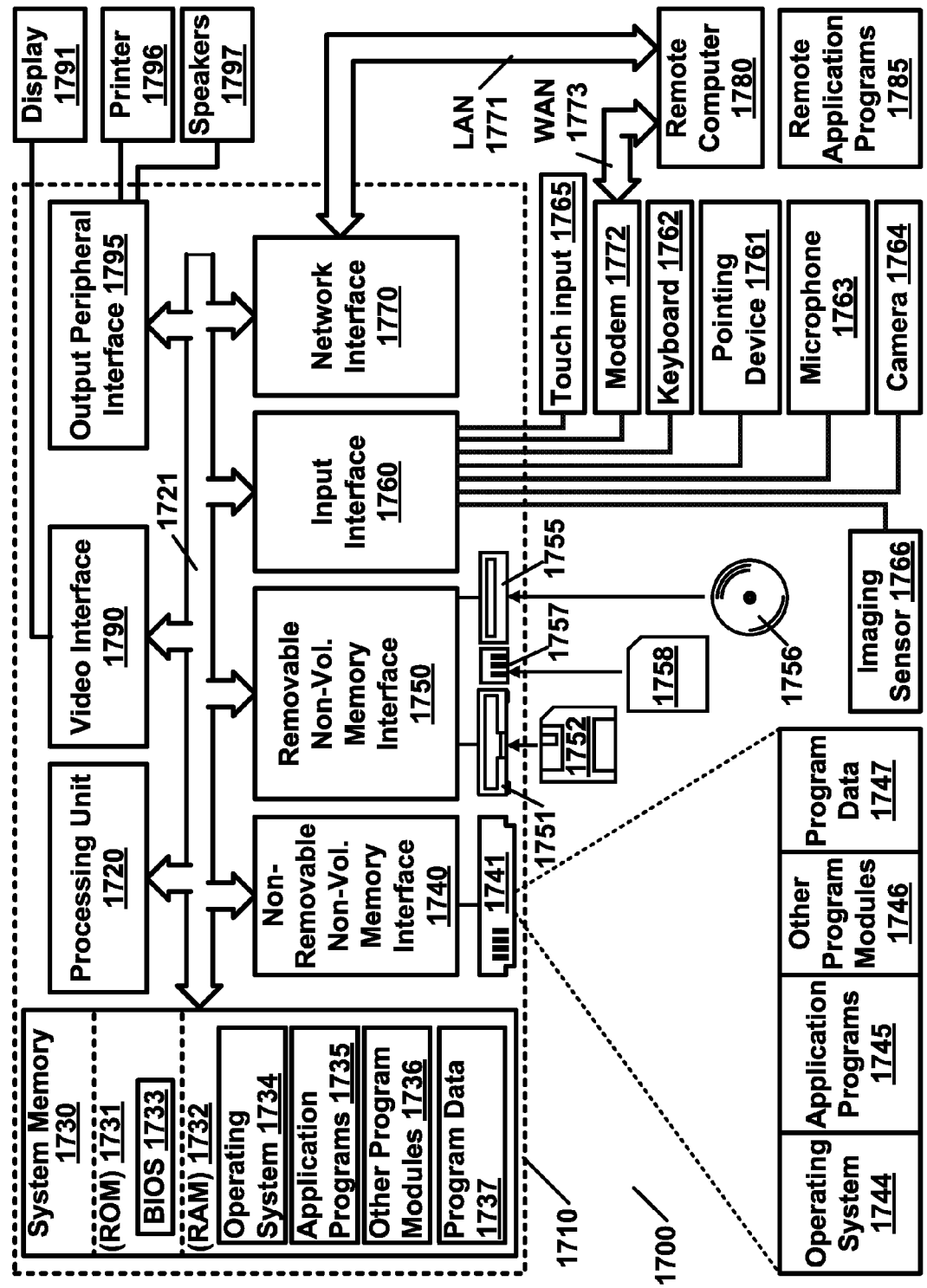
FIG. 17 illustrates an example of a computing system environment on which aspects of some embodiments may be implemented.

FIG. 17 illustrates an example of a suitable computing system environment 1700 on which aspects of some embodiments may be implemented. The computing system environment 1700 is only one example of a suitable computing environment and is not intended to suggest any limitation as to the scope of use or functionality of the claimed subject matter. For example, the computing environment could be an analog circuit. Neither should the computing environment 1700 be interpreted as having any dependency or requirement relating to any one or combination of components illustrated in the exemplary operating environment 1700.

Embodiments are operational with numerous other general purpose or special purpose computing system environments or configurations. Examples of well-known computing systems, environments, and/or configurations that may be suitable for use with various embodiments include, but are not limited to, embedded computing systems, personal computers, server computers, hand-held or laptop devices, smart phones, smart cameras, tablets, multiprocessor systems, microprocessor-based systems, set top boxes, programmable consumer electronics, network PCs, minicomputers, mainframe computers, cloud services, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 17, an example system for implementing some embodiments includes a general-purpose computing device in the form of a computer 1710. Components of computer 1710 may include, but are not limited to, a processing unit 1720, a system memory 1730, and a system bus 1721 that couples various system components including the system memory to the processing unit 1720.

Computer 1710 typically includes a variety of computer readable media. Computer readable media can be any available media that can be accessed by computer 1710 and includes both volatile and nonvolatile media, and removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer 1710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

The system memory 1730 includes computer storage media in the form of volatile and/or nonvolatile memory such as ROM 1731 and RAM 1732. A basic input/output system 1733 (BIOS), containing the basic routines that help to transfer information between elements within computer 1710, such as during start-up, is typically stored in ROM 1731. RAM 1732 typically contains data and/or program modules that are immediately accessible to and/or presently being operated on by processing unit 1720. By way of example, and not limitation, FIG. 17 illustrates operating system 1734, application programs 1735, other program modules 1736, and program data 1737.

The computer 1710 may also include other removable/non-removable volatile/nonvolatile computer storage media. By way of example only, FIG. 17 illustrates a hard disk drive 1741 that reads from or writes to non-removable, nonvolatile magnetic media, a magnetic disk drive 1751 that reads from or writes to a removable, nonvolatile magnetic disk 1752, a flash drive reader 1757 that reads flash drive 1758, and an optical disk drive 1755 that reads from or writes to a removable, nonvolatile optical disk 1756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1741 is typically connected to the system bus 1721 through a non-removable memory interface such as interface 1740, and magnetic disk drive 1751 and optical disk drive 1755 are typically connected to the system bus 1721 by a removable memory interface, such as interface 1750.

The drives and their associated computer storage media discussed above and illustrated in FIG. 17 provide storage of computer readable instructions, data structures, program modules and other data for the computer 1710. In FIG. 17, for example, hard disk drive 1741 is illustrated as storing operating system 1744, application programs 1745, program data 1747, and other program modules 1746. Additionally, for example, non-volatile memory may include instructions to, for example, discover and configure IT device(s); the creation of device neutral user interface command(s); combinations thereof, and/or the like.

Commands and information may be entered into the computing hardware 1710 through input devices such as a keyboard 1762, a microphone 1763, a camera 1764, imaging sensor 1766 (e.g., 1520, 1492, and 1340) and a pointing device 1761, such as a mouse, trackball or touch pad. These and other input devices are often connected to the processing unit 1720 through an input interface 1760 that is coupled to the system bus, but may be connected by other interface and bus structures, such as a parallel port, game port or a universal serial bus (USB). A monitor 1791 or other type of display device may also be connected to the system bus 1721 via an interface, such as a video interface 1790. Other devices, such as, for example, speakers 1797, printer 1796 and network switch(es) 1798 may be connected to the system via peripheral interface 1795.

The computer 1710 is operated in a networked environment using logical connections to one or more remote computers, such as a remote computer 1780. The remote computer 1780 may be a personal computer, a hand-held device, a server, a router, a network PC, a peer device or other common network node, and typically includes many or all of the elements described above relative to the computer 1710. The logical connections depicted in FIG. 17 include a local area network (LAN) 1771 and a wide area network (WAN) 1773, but may also include other networks. Such networking environments are commonplace in offices, enterprise-wide computer networks, intranets and the Internet.

When used in a LAN networking environment, the computer 1710 is connected to the LAN 1771 through a network interface or adapter 1770. When used in a WAN networking environment, the computer 1710 typically includes a modem 1772 or other means for establishing communications over the WAN 1773, such as the Internet. The modem 1772, which may be internal or external, may be connected to the system bus 1721 via the user input interface 1760, or other appropriate mechanism. The modem 1772 may be wired or wireless. Examples of wireless devices may comprise, but are limited to: Wi-Fi and Bluetooth. In a networked environment, program modules depicted relative to the computer 1710, or portions thereof, may be stored in the remote memory storage device. By way of example, and not limitation, FIG. 17 illustrates remote application programs 1785 as residing on remote computer 1780. It will be appreciated that the network connections shown are exemplary and other means of establishing a communications link between the computers may be used. Additionally, for example, LAN 1771 and WAN 1773 may provide a network interface to communicate with other distributed infrastructure management device(s); with IT device(s); with users remotely accessing the User Input Interface 1760; combinations thereof, and/or the like.

Figure 18:
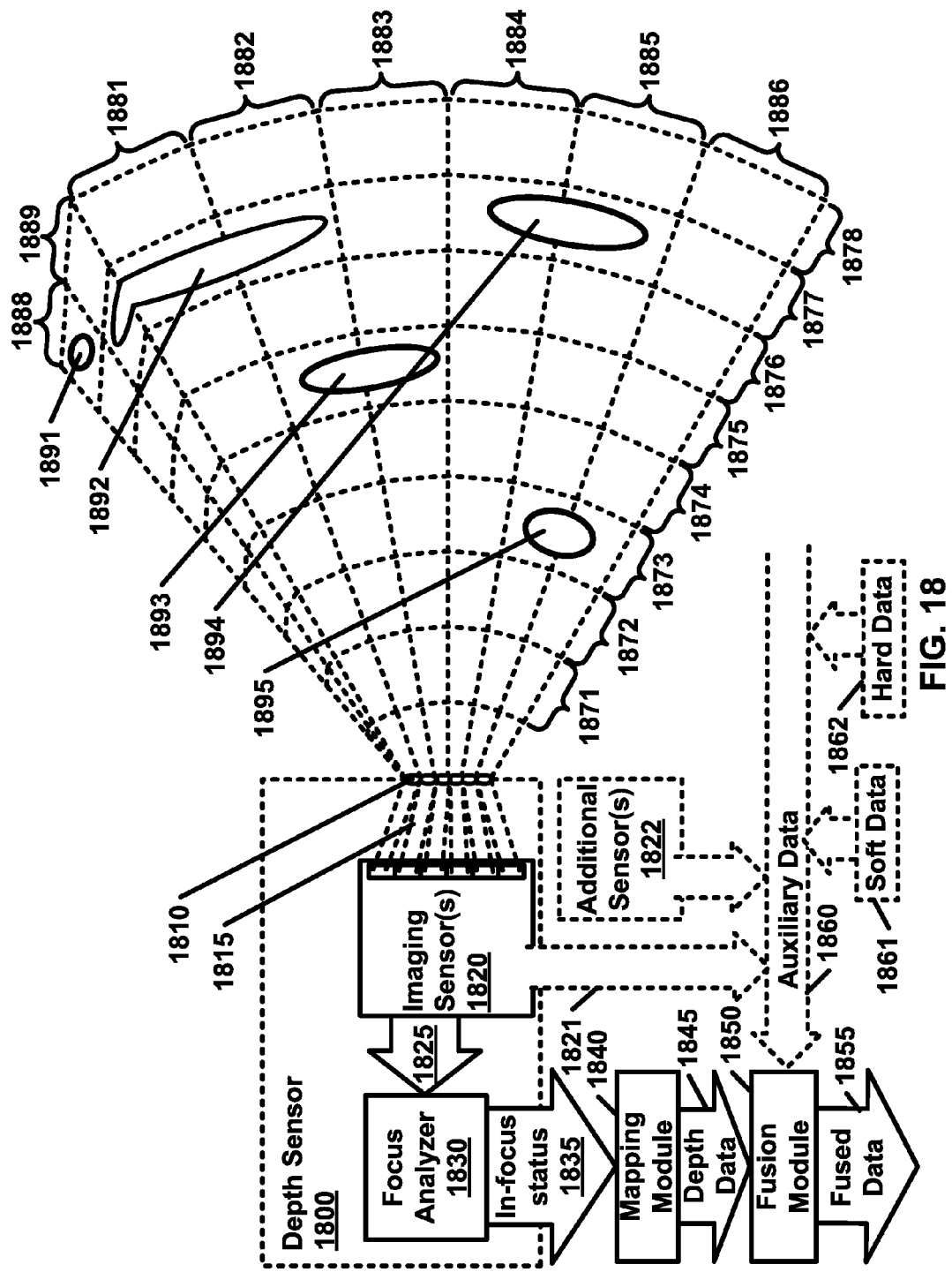
FIG. 18 is a diagram illustrating a depth sensor according to various aspects of an embodiment.

Example FIG. 18 is a diagram illustrating a depth sensor according to various aspects of an embodiment. Embodiments of the present invention comprise a depth sensor 1800 comprising at least one imaging sensor 1820, at least one multifocal lens 1810, and a focus analyzer 1830. The depth sensor 1800 may analyze the in-focus status 1835 of electromagnetic radiation 1815, directed by the multifocal lens(es) 1815 onto sensing zone(s) (e.g., 922-929, 932-934, 945, and 955 of FIGS. 9A, 9B, 9C, and 9D) of the imaging sensor(s) 1820 from spatial zone(s) (e.g. defined by intersections of range bins 1871, 1872, 1873, 1874, 1875, 1876, 1877 and 1878 with elevation beamwidths 1881, 1882, 1883, 1884, 1885, and 1886 with azimuth beamwidths 1888 and 1889) in a measurement field, to detect the presence of object(s) (e.g. 1891, 1892, 1893, 1894 and 1895) in the spatial zone(s) (e.g. defined by intersections of 1871-1878 with 1881-1886 with 1888-1889).

The at least one imaging sensor 1820 may be configured to produce at least one measurement 1825 of each of at least two sensing zones (e.g., 922-929, 932-934, 945, and 955). Measurement(s) 1825 may comprise amplitude, frequency, and/or difference data for a multitude of pixels.

According to an embodiment, at least one of the at least one imaging sensor 1820 may comprise at least one of the following: an infrared imaging sensor; an ultraviolet imaging sensor; an optical imaging sensor; a camera; an X-ray imaging sensor; an electromagnetic imaging sensor; a light field device; an array of imaging sensors, a combination thereof, and/or the like. Additionally, according to an embodiment, at least one of the at least one additional sensor(s) 1822 may comprise at least one of the following: an infrared imaging sensor; an ultraviolet imaging sensor; an optical imaging sensor; a camera; an x-ray imaging sensor; an electromagnetic imaging sensor; a light field device; an array of imaging sensors, a combination thereof, and/or the like.

According to an embodiment, at least one of the sensing zones (e.g., 922-929, 932-934, 945, and 955) may comprise a region of the imaging sensor 1820. According to an embodiment, at least one of the sensing zones (e.g., 922-929, 932-934, 945, and 955) may comprise a subset of pixels on the imaging sensor 1820.

According to an embodiment, the electromagnetic radiation may comprise radiation in the visible band between 0.4 μm and 0.7 μm. This range of electromagnetic radiation may be visible. Similarly, electromagnetic radiation may comprise invisible electromagnetic radiation. Invisible electromagnetic radiation may be below 0.4 μm and/or above 0.7 μm and include ionizing or non-ionizing radiation.

According to an embodiment, each of at least one of the spatial focus zones (e.g. defined by intersections of 1871-1878 with 1881-1886 with 1888-1889) may be azimuth, elevation and/or depth of field limited. According to an embodiment, at least one of the spatial zones (e.g. defined by intersections of 1871-1878 with 1881-1886 with 1888-1889) may comprise a beam comprising an instantaneous field of view and a constrained depth of field. An instantaneous field of view may comprise a field of regard and/or a field of view. A field of regard may comprise a total area that may be captured by a movable sensor. A movable sensor may be moved mechanically and/or electronically. For example, a field of regard may be electronically moved by changed characteristics in a phased array antenna. A movable sensor may be mechanically moved by a mechanical drive, by being pushed, by being carried, by being pulled, combinations thereof, and/or the like. An instantaneous field of view may comprise a field that is perceivable by a sensor at a particular time. The field of view may be angular, distributed, directional, combinations thereof, and/or the like.

The at least one multifocal lens 1810 may be configured to direct electromagnetic radiation 1815 from each of at least two spatial zones (e.g. defined by intersections of 1871-1878 with 1881-1886 with 1888-1889) to at least one of the sensing zones (e.g., 922-929, 932-934, 945, and 955). According to an embodiment, the multi-focal lens 1810 may be configured to direct the electromagnetic radiation 1815 through an imaging device lens.

The focus analyzer 1830 may be configured to process each of the at least one measurement 1825 to determine an in-focus status 1835 of at least one of the sensing zones (e.g., 922-929, 932-934, 945, and 955). According to an embodiment, the focus analyzer 1830 may comprise a module. Sensing zones (e.g., 922-929, 932-934, 945, and 955) and/or groups of sensing zones (e.g., 922-929, 932-934, 945, and 955) may be referred to as Regions of Interest (ROI). According to an embodiment, the focus analyzer 1830 may further comprise at least one of the following: at least one range based point spread function module, a sharpness analysis module, a frequency analysis module, a combination thereof, and/or the like.

An embodiment may further comprise a mapping module 1840 configured to generate depth data 1845 of at least two of the spatial zones (e.g. defined by intersections of 1871-1878 with 1881-1886 with 1888-1889), based at least in part, on the in-focus status. Depth data 1845 may correlate with the distance of spatial zone(s) (e.g. defined by intersections of 1871-1878 with 1881-1886 with 1888-1889) from the sensor(s) (e.g. 1820). Depth data 1845 may be relative. In other words, depth data 1845 may provide distance information between, for example, objects, spatial zones, combinations thereof, and/or the like.

An embodiment may further comprise a fusion module 1850 configured to generate fused data 1885, based at least in part, on: the at least one depth data 1845, auxiliary data 1860 of at least one of the spatial zones (e.g. defined by intersections of 1871-1878 with 1881-1886 with 1888-1889), combinations thereof, and/or the like. Fused data 1855 may comprise fused image(s). An embodiment may further comprise a fusion module 1850 configured to generate fused data 1885, based at least in part, on the depth data 1845 and at least one of the following: true image data, image recognition data, object data, object feature vectors, auxiliary data 1860, combinations thereof, and/or the like. The true image data may be of at least one of the spatial zones (e.g. defined by intersections of 1871-1878 with 1881-1886 with 1888-1889). The image recognition data may be of at least one of the spatial zones (e.g. defined by intersections of 1871-1878 with 1881-1886 with 1888-1889). The object data may be for an object determined to have a probability of residing in at least one of the spatial zones (e.g. defined by intersections of 1871-1878 with 1881-1886 with 1888-1889). For example, object data may comprise information in a database describing characteristics of objects that may have a probability of being located in one of the spatial zones (e.g. defined by intersections of 1871-1878 with 1881-1886 with 1888-1889). Examples of objects may comprise: furniture, people, toys, electronics, equipment, clothing, food, combinations thereof, and/or the like.

Auxiliary data 1860 may comprise data that may provide assistance and context to employing the depth data 1845. In other words, auxiliary data 1860 may be employed to simplify and/or facilitate operations employing depth data 1845. Auxiliary data 1860 may be fused with depth data 1845.

The auxiliary data 1860 may comprise sensor data from additional sensor(s) 1882. Examples of additional sensor(s) 1882 comprise imaging devices, chemical detection sensors, vibration detecting sensors, electrical sensors, navigation sensors, pressure sensors, force sensors, thermal sensors, proximity sensors, combinations thereof, and/or the like. The auxiliary data 1860 may comprise additional sensor data from imaging sensor(s) 1820, including, but not limited to true image data. The auxiliary data 1860 may comprise soft data 1861. Soft data 1861 may comprise information from, for example, a database. Soft data 1861 may comprise information collected about and/or describing characteristics of: a measurement field, sensors, objects, combinations thereof, and/or the like. The auxiliary data 1860 may comprise position data, speed data, and/or acceleration data for at least one of at least one of the spatial zones (e.g. defined by intersections of 1871-1878 with 1881-1886 with 1888-1889) and/or at least one of the at least one imaging sensor 1820. The auxiliary data 1860 may comprise hard data 1862. Hard data 1862 may comprise data measured employing physical devices. Hard data may be stored data (e.g. in a database and/or lookup table) or data accessed from a physical device comprising the hard data.

According to an embodiment, the auxiliary data may comprise monocular image data of at least one of the spatial zones (e.g. defined by intersections of 1871-1878 with 1881-1886 with 1888-1889). Monocular image data may comprise image data of some or all of measurement field from a single point of view and/or single imaging sensor. A measurement field may comprise at least one of the spatial zones (e.g. defined by intersections of 1871-1878 with 1881-1886 with 1888-1889). According to an embodiment, the auxiliary data may comprise multi-ocular image data of at least one of the spatial zones (e.g. defined by intersections of 1871-1878 with 1881-1886 with 1888-1889). Multi-ocular image data may comprise multiple views and/or perspectives image data of all or part of an image field. Multi-ocular image data may be collected from one or more imaging devices that employ one or more lenses. According to an embodiment, the auxiliary data may comprise multi-dimensional image data of at least one of the spatial zones (e.g. defined by intersections of 1871-1878 with 1881-1886 with 1888-1889). Multi-dimensional image data may comprise, for example, 3-D spatial data, hyperspectral data, temporal data, data from multiple heterogeneous sources, combinations thereof, and/or the like.

Figure 9A:
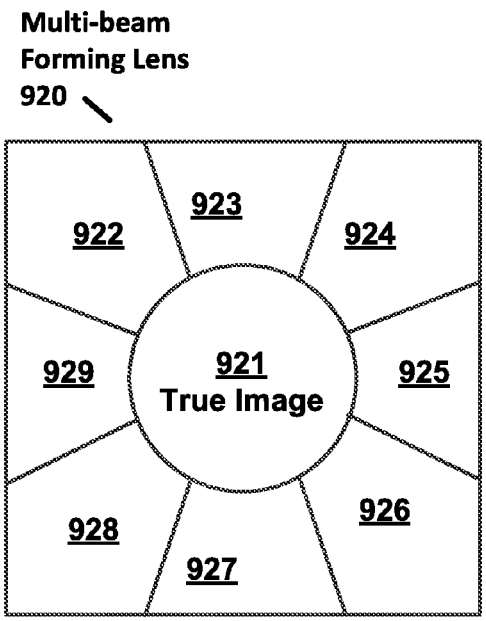
FIG. 9A, FIG. 9B, FIG. 9C, and FIG. 9D show multi-beam forming lenses according to various aspects of an embodiment.
Figure 9C:
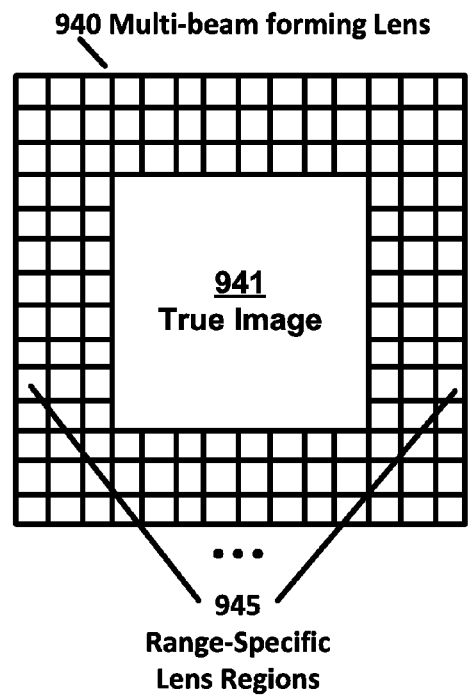
Figure 9B:
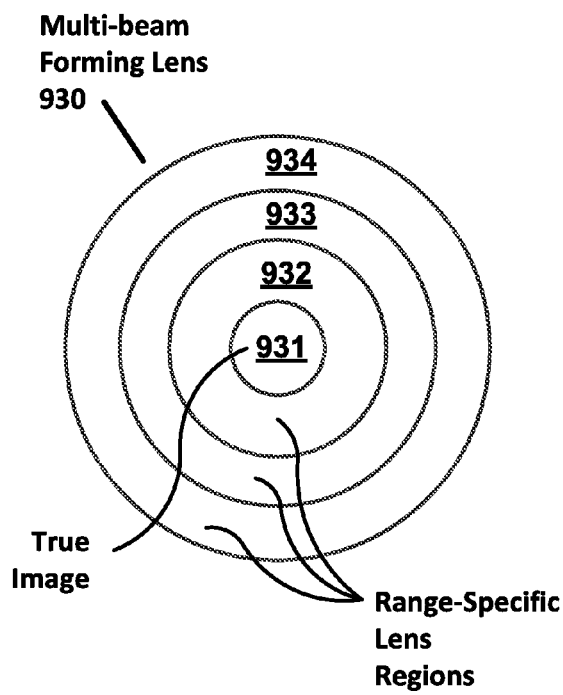
Figure 9D:
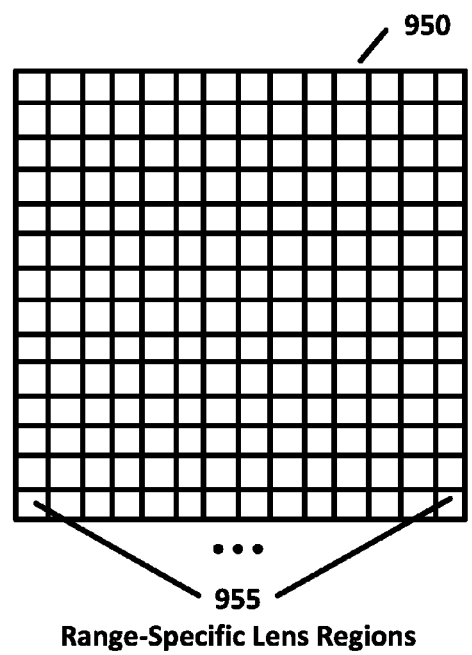

According to an embodiment, the fusion module 1850 may be further configured to receive auxiliary data 1860, at least in part, from at least two sensing zones (e.g., 955 of FIG. 9D). Auxiliary data may be obtained from imaging sensor 1820 via communications pathway 1821. The auxiliary data 1860 may comprise image data fused by combining multiple sensing zones (e.g., 955) into one image. This fusion may employ a multifocal lens (See FIG. 9 D) that does not have a true image lens section. Separate sensing zones from sensing zones 955 may be combined to form a composite image of multiple sensing zones.

According to an embodiment, the fusion module 1850 may be further configured to receive auxiliary data, at least in part, from one of the sensing zones (e.g., 922-929, 932-934, 945, and 955) configured to receive electromagnetic radiation from at least two of the spatial zones (e.g. defined by intersections of 1871-1878 with 1881-1886 with 1888-1889). In such an embodiment, the multifocal lens 1810 may comprise a true image sensing zone created by a true image region of a multifocal lens 1810. FIGS. 9A though 9C illustrate example embodiments of multifocal lenses with true image regions (e.g. 921, 931, and 941). According to an embodiment, the fusion module 1850 may be further configured to receive auxiliary data, at least in part, from at least one of the at least two sensing zones (e.g.,

922-929, 932-934, 945, and 955). According to an embodiment, at least one of the at least one multifocal lens 1810 may be configured to direct electromagnetic radiation from two of a multitude of spatial zones (e.g. defined by intersections of 1871-1878 with 1881-1886 with 1888-1889) to one of the sensing zones (e.g., 922-929, 932-934, 945, and 955). This embodiment may employ a multifocal lens 1810 with a true image region.

Figure 19:
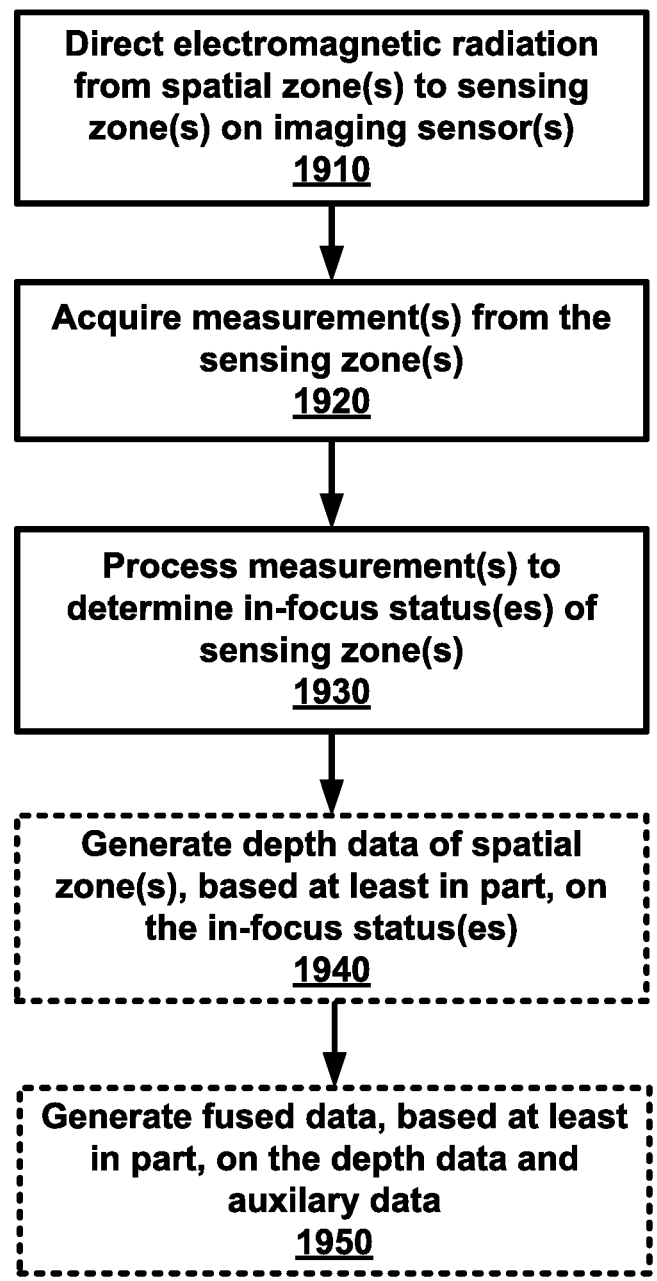
FIG. 19 is a flow diagram of depth detection according to various aspects of an embodiment.

Example FIG. 19 is a flow diagram of depth detection according to various aspects of an embodiment. Electromagnetic radiation may be directed from spatial zone(s) to sensing zone(s) on imaging sensor(s) at 1910. Measurement(s) from the sensing zone(s) may be acquired at 1920. The in-focus status(es) of the sensing zone(s) measurement(s) may be determined at 1930. Optional block 1940 may generate depth data of spatial zone(s), based at least in part, on the in-focus status(es). At optional block 1950, fused data may be generated, based at least in part, on the depth data and auxiliary data.

A depth sensor 1800 may be employed to measure depth information within a measurement field. The measurement field may comprise a three dimensional volumetric field. The depth information may be mapped into the measurement field to identify the location of objects within the measurement field.

A depth sensor may be employed by devices such as, but not limited to: augmented reality headsets, augmented reality systems, mapping devices, and a 3-D mapping cameras. Depth sensors may be employed in digital photography. Depth information incorporated (or fused) with photos and video may provide options to enhance editing digital content. For example, depth data may be employed to remove and replace the background of an image, or segment (e.g., "cut out") a specific object for use as a standalone. Depth sensors may be employed in mapping and navigation. Depth sensor(s) may be employed to provide mapping applications with accurate 3D models of building interiors. Depth sensor(s) may also provide a user's position and orientation within buildings to guide them directly to a product or service. Depth sensors may be employed in fashion and apparel to enable accurate sizing recommendations and custom tailoring. Retailers may employ applications that depth sensors to provide sizing recommendation and capture personalized body shape to drive down returns and improve knowledge of customers. Depth sensors may be employed in product design and 3D printing. With depth sensors, users may scan real-world objects or people. Artists may then build, print, and manufacture personalized products at scale. Depth sensors may reduce the expertise required and the overhead demanded to design and print in 3D.

According to an embodiment, a depth sensor may be able to see around some objects in the measurement field. A depth sensor may be able to see around some objects in the measurement field based on focula lens position. A depth sensor may be able to see around some objects employing a multitude of imaging sensors to provide multiple views of the measurement field. In some situations, placement of a depth sensor (or parts thereof) with respect to object may increase and/or decrease the ability of the depth sensor to image objects behind other objects.

According to an embodiment, data from the depth sensor may be employed by a sensor data fusion module to add auxiliary data to the depth data of all and/or part of a measurement field. For example, a fusion module may add environmental data to an image. Environmental data may include the position of objects in the measurement field or its poise.

Embodiments may be employed in an augmented reality (AR) system. AR is a live direct or indirect view of a physical, real-world environment whose elements are augmented (or supplemented) by computer-generated sensory or pseudo-sensory input such as sound, video, graphics, combinations thereof, and/or the like. AR is related to a more general concept called mediated reality, in which a view of reality is modified (possibly even diminished rather than augmented) by a computer. As a result, AR may enhance one's current perception of reality. By contrast, virtual reality replaces the real world with a simulated world. Augmentation may occur in real-time, near real-time or via post processing. Depth data may be employed to provide information about the surrounding real world of a user. Depth information may be employed to interact and/or manipulate interactions and/or perception of the real world. Depth information may be combined with additional technologies such as computer vision and/or object recognition to describe the physical environment. The information about the environment and its objects may be employed to introduce additional images to a captured image of the physical environment. The Information about the environment and its objects may be employed to remove and/or modify existing portions of a captured image of the physical environment. For example, information about the environment may be employed to overlay images on real world images. The information about the environment and its objects may be employed to create a virtual representation of at least a portion of a physical environment. The information may be virtual and/or real, e.g. seeing other real sensed and/or measured information such as electromagnetic radio waves overlaid in alignment with where they are in space.

Embodiments may be employed in a headset. Depth sensor data may be fused with additional data. For example, depth data may be fused with data from additional sensor(s) including, for example: environmental sensor(s), camera(s), and/or inertial measurement unit(s) (IMU). The depth sensor data and/or additional sensor(s) data may be employed to track an environment including, for example: objects, movements, gestures, temperatures, sounds, radiation, combinations thereof, and/or the like. A headset may display computer generated images employing the depth sensor data and/or additional sensor(s) data. The generated images may comprise holographic images.

Embodiments may employ reflected radiation from objects without depending upon a projected image. Whereas some depth sensors depend upon projections of images such as structured light on a measurement field, embodiments may employ reflected radiation from objects without a dependence upon a projected image. Projected images are sometimes projected using non-visible radiation such as, for example, infrared light. Imaging sensors may employ images of the measurement field with the projected images superimposed upon the measurement field to locate positions of objects in the measurement field. External sources of radiation (e.g. daylight and/or lamps) may wash out the projected images making location measurements difficult. Embodiments overcome this issue and may be implemented without the projection of location assistance images.

According to an embodiment, a lens may be employed to map ranges of a measurement field to parts of images. A sequence of images, each focused on a different subject (e.g. faces, cars, objects, lines (on a field) may be taken of the parts of the image. The individually focused images may be processed to create a uniformly focused resultant image. The resultant image may be employed as a true image.

The fusion module may employ hard and/or soft fusion. The fusion module may fuse data from physical sensors ("hard" data) and from human observers ("soft" data). Hard sensor data may comprise depth sensor data, sensor data, images or scalar information related to the location, identification and characterization of entities (e.g., humans, vehicles, etc.), while soft data may comprise textual information (observations, inferences, written or oral reports, and comments). The fusion module may also employ "contextual" information (e.g., socio-cultural data), much of which may comprise soft data. Applications for the fused data may comprise such areas as, for example: environmental monitoring, citizen science, military situation awareness/assessment, gaming, emergency response, and/or the like.

Measured data may be combined with additional data for sources such as a database. For example, image recognition may be employed to identify an object based on object data stored in a database. Object data may comprise representation data of an object such as, for example, a computer aided design (CAD) representation, a 3-D representation, a characteristics file, combinations thereof, and/or the like. Physical and/or virtual representations may be combined into a fused data set. The fused data set may comprise image data.

Embodiments may be employed in spatial augmented reality (SAR). SAR may augment real world objects and scenes without the use of special displays such as monitors, head mounted displays or hand-held devices. SAR may make use of digital projectors to display graphical information onto physical objects. The physical objects may be located employing a depth sensor. The key difference in SAR versus AR is that a display may be separated from user(s) of the system. Because the displays may not be associated with each user, SAR may scale naturally up to groups of users, thus allowing for collocated collaboration between users. User(s) may also be located employing a depth sensor. Examples of SAR devices include, for example: shader lamps, mobile projectors, virtual tables, smart projectors, combinations thereof, and/or the like. Shader lamps may mimic and augment reality by projecting imagery onto neutral objects, providing the opportunity to enhance the object's appearance. Other applications may comprise table and wall projections. An extended virtual table may be employed that separates the virtual from the real by including beam-splitter mirrors attached to the ceiling at an adjustable angle. Virtual showcases, which employ beam-splitter mirrors together with multiple graphics displays, provide an interactive means of simultaneously engaging with the virtual and the real. Many more implementations and configurations make spatial augmented reality display an increasingly attractive interactive alternative.

The fusion module may fuse tracking data with depth sensor data. Tracking data may comprise sensor data from tracking technologies, such as, for example: digital cameras and/or other optical sensors, accelerometers, GPS, gyroscopes, solid state compasses, RFID, wireless sensors, combinations thereof, and/or the like. These technologies may offer varying levels of accuracy and precision. Tracking data may track position and/or orientation of, for example: a user's head, a user's appendage (e.g. hand, foot), a handheld input device, a mobile object, combinations thereof, and/or the like.

The fusion module may fuse input data with depth sensor data. Input data may comprise, for example: speech recognition devices, gesture motion devices, controllers, keyboards, mice, trackballs, temperature sensors, humidity sensors, light sensors, combinations thereof, and/or the like. Speech recognition systems may translate a user's spoken words into computer instructions and gesture recognition systems may interpret a user's body movements.

AR systems may integrate augmentations with the real world. Image registration may be employed to fuse sensor data (e.g. tracking data) to images. Image registration may employ processes from visual odometry. Image registration may comprise two parts. Part one may comprise detecting interest points, or fiducial markers, or optical flow in camera images. The first stage may employ feature detection methods like, depth sensor detection, corner detection, blob detection, edge detection or thresholding, combinations thereof, and/or the like. The second stage may restore a real world coordinate system from the data obtained in the first stage. Some processes may assume objects with known geometry (or fiducial markers) present in the scene. In some of those case, the scene 3D structure may be pre-calculated beforehand. If part of a scene is unknown, simultaneous localization and mapping (SLAM) may map relative positions. SLAM may employ depth sensor embodiments. If no information about scene geometry is available, structure from motion methods like bundle adjustment may be employed. Mathematical processes employed in the second stage may comprise projective (epipolar) geometry, geometric algebra, rotation representation with exponential map, Kalman and particle filters, nonlinear optimization, robust statistics, combinations thereof, and/or the like.

The fusion module may employ a description language such as, for example, Augmented Reality Markup Language (ARML). ARML is a data standard developed within the Open Geospatial Consortium (OGC), which comprises an XML grammar to describe the location and appearance of objects (virtual and/or real) in a scene. ARML may employ script binding (e.g. ECMAScript bindings) to allow dynamic access to properties of virtual objects.

In-focus status may be determined by detecting sharpness of a region of interest (ROI). A process for detecting sharpness may comprise Canny edge detection over a ROI. A process for detecting sharpness may comprise computing and analyzing a Fourier transform of a ROI. The Fourier transform may tell which frequencies are present in the ROI. If there is a low amount of high frequencies, then the image may be determined to be blurry. A value representing the blurriness of a ROI may employ a metric. Examples of metrics may be generated by convolving the ROI with a Laplacian kernel: and use a metric on the output to get a number which may be used for thresholding. Another way to estimate the sharpness of a ROI is to use a Laplacian of Gaussian (LoG) filter and pick a value (e.g. a maximum value). Using a measure like a 99.9% quantile may be employed if the ROI is noisy (i.e. picking the $n^{th}$-highest contrast instead of the highest contrast.) For images with varying image brightness, a preprocessing step may be employed to normalize image brightness/contrast (e.g. histogram equalization).

Embodiments may set an alert if the focus status changes in any volume. The alert may activate an alarm system. An alert may activate a surveillance camera/system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In this specification, "a" and "an" and similar phrases are to be interpreted as "at least one" and "one or more."

References to "an" embodiment in this disclosure are not necessarily to the same embodiment.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e. hardware with a biological element), or a combination thereof, all of which are behaviorally equivalent. For example, modules may be implemented using computer hardware in combination with software routine(s) written in a computer language (e.g., C, C++, FORTRAN, Java, Basic, Matlab™ or the like) or a modeling/simulation program (e.g., Simulink™, Stateflow™, GNU Octave™, or LabVIEW™ MathScript). Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, some of the above explanation has focused on the example of an embodiment where the personal warning device may be employed as a personal warning device worn on a user's back. However, one skilled in the art will recognize that embodiments of the invention could be employed in other areas such as, but not limited to: building security, automated driving, monitoring races, motion capture, combinations thereof, and/or the like.

In addition, it should be understood that any figures that highlight any functionality and/or advantages, are presented for example purposes only. The disclosed architecture is sufficiently flexible and configurable, such that it may be utilized in ways other than those shown. For example, the steps listed in any flowchart may be re-ordered or only optionally used in some embodiments. Elements in the figures with the dashed lines may be indicative of optional elements that may be employed, in various combinations to create alternative embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. An apparatus, comprising:
   a. an imaging sensor configured to produce at least one measurement of each of at least two distinct sensing zones on the imaging sensor, wherein each of the at least two distinct sensing zones comprises at least two pixels;
   b. at least one multifocal lens configured to direct electromagnetic radiation, from each of at least two distinct three-dimensional spatial zones, to at least one of the at least two distinct sensing zones; and
   c. a focus analyzer configured to process each of the at least one measurement to determine an in-focus status of at least one of the distinct sensing zones independent of the other distinct sensing zones.

2. The apparatus according to claim 1, further comprising a mapping module configured to generate depth data of at least two of the spatial zones, based at least in part, on the in-focus status.

3. The apparatus according to claim 2, further comprising a fusion module configured to generate at least one fused data, based at least in part, on:
   a. the at least one depth data; and
   b. auxiliary data of at least one of the spatial zones.

4. The apparatus according to claim 2, further comprising a fusion module configured to generate fused data, based at least in part, on the depth data and at least one of the following:
   a. true image data of at least one of the spatial zones;
   b. image recognition data of at least one of the spatial zones;
   c. object data for an object determined to have a probability of residing in at least one of the spatial zones;
   d. auxiliary data; and
   e. at one of the following for at least one of at least one of the spatial zones and the imaging sensor:
      i. position data;
      ii. speed data; and
      iii. acceleration data.

5. The apparatus according to claim 3, wherein the auxiliary data comprises monocular image data of at least one of the spatial zones.

6. The apparatus according to claim 3, wherein the auxiliary data comprises multi-ocular image data of at least one of the spatial zones.

7. The apparatus according to claim 3, wherein the auxiliary data comprises multi-dimensional image data of at least one of the spatial zones.

8. The apparatus according to claim 3, wherein the fusion module is further configured to receive auxiliary data, at least in part, from at least one additional sensor.

9. The apparatus according to claim 3, wherein the fusion module is further configured to receive auxiliary data, at least in part, from at least two sensing zones.

10. The apparatus according to claim 3, wherein the fusion module is further configured to receive auxiliary data, at least in part, from one of the sensing zones configured to receive electromagnetic radiation from at least two of the spatial zones.

11. The apparatus according to claim 3, wherein the fusion module is further configured to receive auxiliary data, at least in part, from at least one of the at least two sensing zones.

12. The apparatus according to claim 3, wherein at least one of the at least one multifocal lens is configured to direct electromagnetic radiation from each of the at least two distinct three-dimensional spatial zones to one of the at least two distinct sensing zones.

13. The apparatus according to claim 1, wherein the imaging sensor comprises at least one of the following:
   a. an infrared imaging sensor;
   b. an ultraviolet imaging sensor;
   c. an optical imaging sensor;
   d. a camera;
   e. an X-ray imaging sensor;
   f. an electromagnetic imaging sensor;
   g. a light field device;
   h. an array of imaging sensors; and
   i. a multitude of imaging sensors.

14. The apparatus according to claim 1, wherein the electromagnetic radiation comprises radiation between 0.4 µm and 0.7 µm.

15. The apparatus according to claim 1, wherein each of at least one of the at least two distinct three-dimensional spatial zones is azimuth, elevation and depth of field limited.

16. The apparatus according to claim 1, wherein at least one of the spatial zones is a beam comprising an instantaneous field of view and a constrained depth of field.

17. The apparatus according to claim 1, wherein at least one of the sensing zones comprises a subset of pixels on the imaging sensor.

18. The apparatus according to claim 1, wherein the focus analyzer further comprises at least one of the following:
   a. at least one range based point spread function module;
   b. a sharpness analysis module; and
   c. a frequency analysis module.

19. The apparatus according to claim 1, wherein at least one of the sensing zones comprise a distinct region of the imaging sensor.

20. The apparatus according to claim 1, wherein the multi-focal lens is configured to direct the electromagnetic radiation through an imaging device lens.

* * * * *